(12) United States Patent
Iguchi

(10) Patent No.: US 11,561,286 B2
(45) Date of Patent: Jan. 24, 2023

(54) OPTICAL RADAR APPARATUS FOR LONG DISTANCE MEASUREMENT

(71) Applicant: SHARP KABUSHIKI KAISHA, Sakai (JP)

(72) Inventor: Katsuji Iguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 946 days.

(21) Appl. No.: 16/392,186

(22) Filed: Apr. 23, 2019

(65) Prior Publication Data

US 2019/0331771 A1 Oct. 31, 2019

(30) Foreign Application Priority Data

Apr. 27, 2018 (JP) .............................. JP2018-087656

(51) Int. Cl.
| | |
|---|---|
| *G01S 7/481* | (2006.01) |
| *G01S 7/4863* | (2020.01) |
| *G01S 7/486* | (2020.01) |
| *G01S 17/42* | (2006.01) |
| *G01S 17/08* | (2006.01) |

(52) U.S. Cl.
CPC ............ *G01S 7/4817* (2013.01); *G01S 7/486* (2013.01); *G01S 7/4816* (2013.01); *G01S 7/4863* (2013.01); *G01S 7/4868* (2013.01); *G01S 17/08* (2013.01); *G01S 17/42* (2013.01)

(58) Field of Classification Search
CPC .... G01S 7/4817; G01S 7/4863; G01S 7/4868; G01S 17/42; G01S 7/4816; G01S 7/486; G01S 17/08; G01S 7/4808; G01S 7/4865; G02B 27/0172
See application file for complete search history.

(56) References Cited

U.S. PATENT DOCUMENTS

| | | | |
|---|---|---|---|
| 2009/0045323 A1* | 2/2009 | Lu | G06T 7/80 |
| | | | 250/208.1 |
| 2013/0032699 A1 | 2/2013 | Widzgowski | |
| 2017/0139040 A1* | 5/2017 | Mellot | G01S 17/10 |
| 2018/0180470 A1* | 6/2018 | Seitz | G01J 1/46 |
| 2019/0019302 A1* | 1/2019 | Akkaya | G01S 7/4817 |

FOREIGN PATENT DOCUMENTS

| | | |
|---|---|---|
| JP | 2004-157044 A | 6/2004 |
| JP | 2011-021980 A | 2/2011 |
| JP | 2013-033044 A | 2/2013 |

(Continued)

*Primary Examiner* — Jennifer D Bennett
*Assistant Examiner* — Erin R Garber
(74) *Attorney, Agent, or Firm* — ScienBiziP, P.C.

(57) ABSTRACT

Provided is a non-mechanical-scanning-type optical radar apparatus that is capable of long distance measurement and its cost is reduced. The optical radar apparatus includes: a light emitting section; and a light receiving system, the light receiving system at least including a focusing optical element and a distance sensor that includes a light receiver, the target field of view being projected on the light receiver through the focusing optical element, the distance sensor being configured to set an activation region in a part of the light receiver depending on the scanning with the light and measure a distance to the object with use of a signal from the activation region.

17 Claims, 18 Drawing Sheets

(56) References Cited

FOREIGN PATENT DOCUMENTS

| | | |
|---|---|---|
| JP | 2014-059301 A | 4/2014 |
| JP | 2016-161438 A | 9/2016 |
| WO | 2008/008970 A2 | 1/2008 |
| WO | 2011/146523 A2 | 11/2011 |
| WO | 2017/112416 A1 | 6/2017 |
| WO | 2017/180277 A1 | 10/2017 |

* cited by examiner

FIG. 2
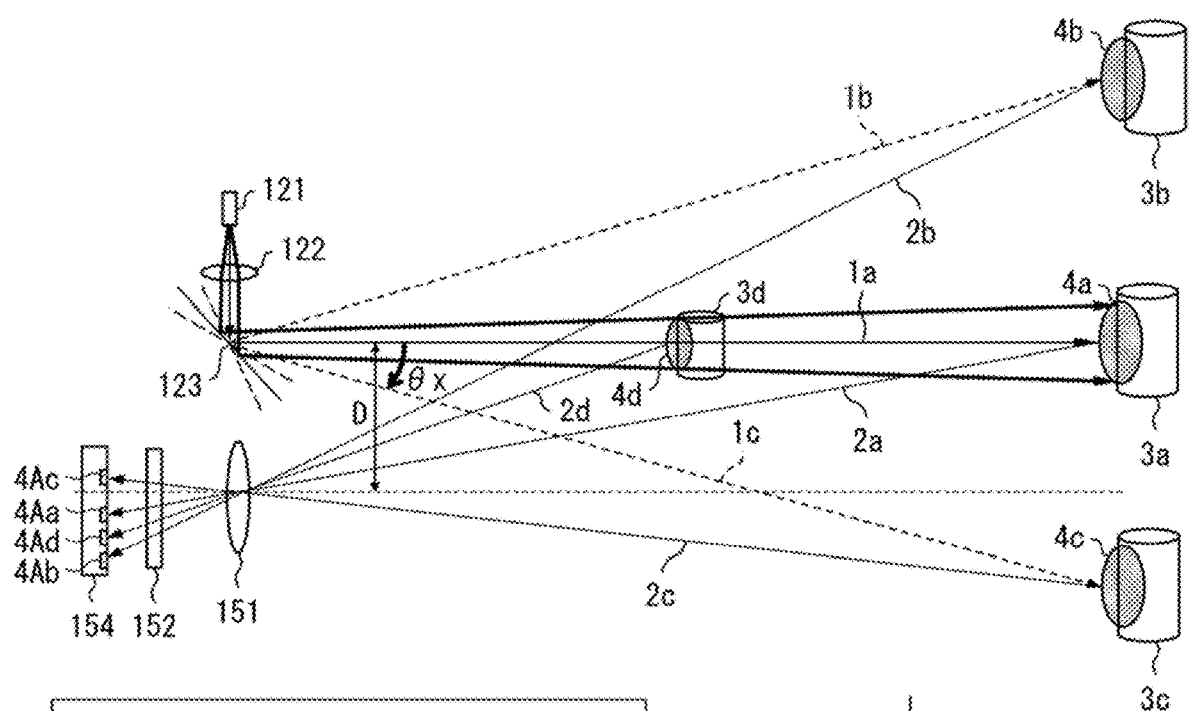
1a, 1b, 1c: LIGHT
2a, 2b, 2c, 2d: REFLECTED LIGHT
3a, 3b, 3c, 3d: OBJECT
4a, 4b, 4c, 4d: IRRADIATED REGION
4Aa, 4Ab, 4Ac, 4Ad: PROJECTION REGION
121: LIGHT EMITTING DEVICE
122: COLLIMATOR LENS
123: SCANNER
151: FOCUSING OPTICAL ELEMENT
152: OPTICAL BAND-PASS FILTER
154: LIGHT RECEIVER
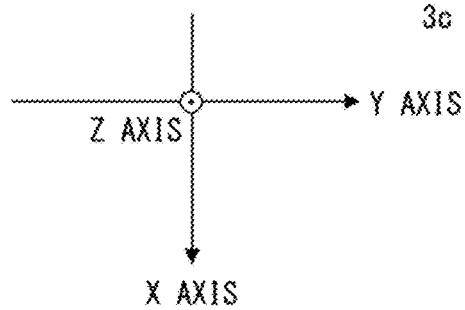

FIG. 4
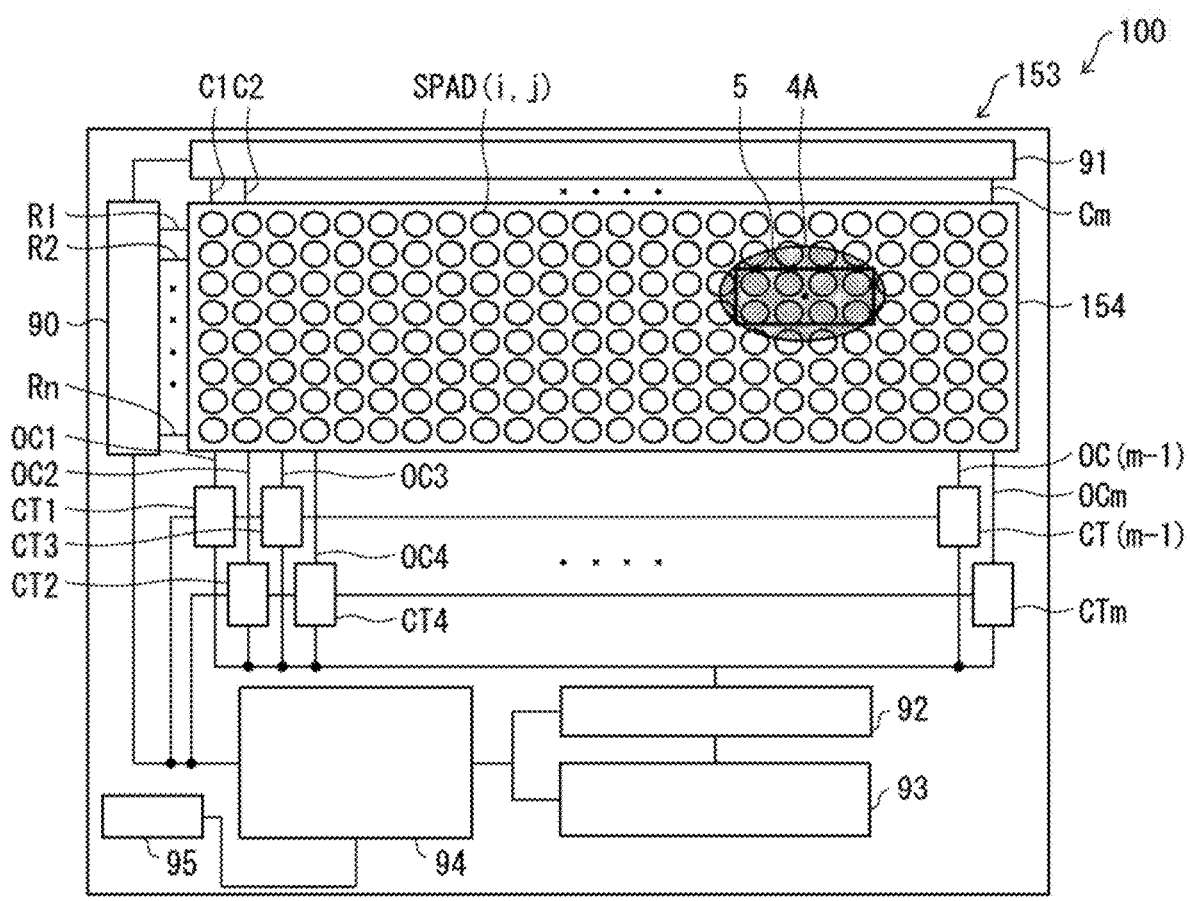
4A: PROJECTION REGION
5: ACTIVATION REGION
90: ROW SELECTING SECTION
91: COLUMN SELECTING SECTION
92: SUMMING CIRCUIT
93: DISTANCE MEASUREMENT UNIT
94: CONTROL CIRCUIT
95: MEMORY
100: OPTICAL RADAR APPARATUS
153: DISTANCE SENSOR
154: LIGHT RECEIVER
C1, C2, Cm: COLUMN SELECTION LINE
CT1~4, CTm, CT(m-1): COLUMN COUNTER
OC1~4, OCm, OC(m-1): COLUMN SIGNAL LINE
R1, R2, Rn: ROW SELECTION LINE
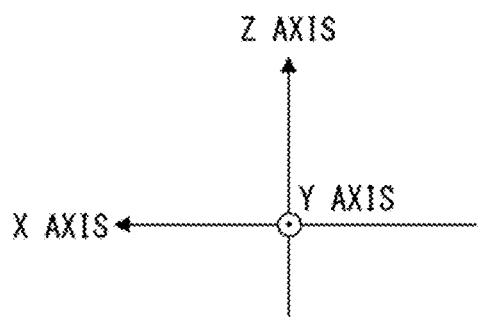

90: ROW SELECTING SECTION
C1, C2, Cm: COLUMN SELECTION LINE
OC1, OC2, OCm: COLUMN SIGNAL LINE
R1~3, Rn: ROW SELECTION LINE
S1~3, Sn: SWITCH

OPTICAL RADAR APPARATUS FOR LONG DISTANCE MEASUREMENT

This Nonprovisional application claims priority under 35 U.S.C. § 119 on Patent Application No. 2018-087656 filed in Japan on Apr. 27, 2018, the entire contents of which are hereby incorporated by reference.

TECHNICAL FIELD

An embodiment of the present invention relates to an optical radar apparatus that measures the distance to an object.

BACKGROUND ART

A three-dimensional image is a concept that not only includes a two-dimensional image like a normal photograph but also includes information of the distance to an object within the field of view, and has been increasingly used recently for recognition of objects around an automobile, robot, or the like. One method, which has been increasingly used, of obtaining highly accurate distance information is a method of measuring time-of-flight (ToF) that is the measurement of the time taken by laser light to travel to and from an object.

Examples of a method to emit laser light toward the field of view include: a rotational method by which a light emission portion emitting a substantially collimated, narrow laser beam (spot beam) and a light receiver are rotated together (see Patent Literatures 1 and 2); a scan method by which a spot beam is scanned using a mirror or the like (Patent Literature 3); and an overall radiation method by which the entire field of view is irradiated with a substantially uniform, wide laser beam (Patent Literature 4).

The overall radiation method does not necessitate any mechanical mechanism, and therefore makes it easy to reduce the size of an apparatus; however, the laser light intensity at an object is weak as compared to when the scan method is employed. Therefore, as the distance to the object increases, the signal intensity weakens, resulting in a reduction in accuracy of distance measurement.

On the other hand, in cases where a laser beam is shaped into a line and scanning is carried out only in one direction (see Patent Literature 3), the irradiation intensity improves as compared to the overall radiation method, but not to a sufficient extent. In reality, in regard to apparatuses that are intended for measurement of long distances like 50 m to 200 m, many of the so-far-developed apparatuses employ the rotational method or the scan method that uses a spot beam and that allows easy achievement of strong beam intensity at the object. For the apparatuses to achieve both high frame rate and high resolution, the rotational method which uses a plurality of laser sources and respective corresponding light receiving elements has been employed most often (see Patent Literatures 1 and 2).

CITATION LIST

Patent Literature

Patent Literature 1
PCT International Publication No. WO2008/008970 (Publication Date: Jan. 17, 2008)
Patent Literature 2
PCT International Publication No. WO2011/146523 (Publication Date: Nov. 24, 2011)
Patent Literature 3
Japanese Patent Application Publication, Tokukai, No. 2011-021980 (Publication Date: Feb. 3, 2011)
Patent Literature 4
Japanese Patent Application Publication, Tokukai, No. 2016-161438 (Publication Date: Sep. 5, 2016)

SUMMARY OF INVENTION

Technical Problem

However, the above-described conventional optical radar apparatuses have an issue in that they cannot achieve cost reduction without affecting the maximum measurable distance, for the following reasons.

Specifically, the rotational optical radar apparatus in which a plurality of laser sources and their corresponding light receiving elements are used necessitates a mechanical rotation mechanism, and therefore it is difficult to achieve long-term reliability and size reduction.

To address this, a non-mechanical-scanning-type apparatus has been developed, in which scanning of spot laser light is carried out with an MEMS mirror, an optical phased array antenna device, a liquid crystal polarization grating, or the like. However, such a non-mechanical-scanning-type apparatus employs a small laser light emitting part, and therefore, in cases where the emitted light comes back along the same path, the light collection efficiency is low and the maximum measurable distance cannot be increased.

One aspect of the present invention was made in view of the above conventional issues, and an object thereof is to provide a non-mechanical-scanning-type optical radar apparatus that achieves cost reduction without affecting the maximum measurable distance.

Solution to Problem

In order to attain the above object, an optical radar apparatus in accordance with one aspect of the present invention includes: a light emitting section configured to emit light so as to scan the light with respect to a target field of view; and a light receiving system configured to receive reflected light, the reflected light being the light that has been reflected by an object in the target field of view, the light receiving system at least including a focusing optical element and a distance sensor that includes a light receiver, the target field of view being projected on the light receiver through the focusing optical element, the distance sensor being configured to set an activation region in a part of the light receiver, the activation region corresponding to the light thus scanned, and measure a distance to the object with use of a signal from the activation region.

Advantageous Effects of Invention

According to one aspect of the present invention, it is possible to provide a non-mechanical-scanning-type optical radar apparatus that achieves cost reduction without affecting the maximum measurable distance.

BRIEF DESCRIPTION OF DRAWINGS

FIG. 2 schematically shows optical paths in relation to the optical radar apparatus in accordance with Embodiment 1 of the present invention.

FIG. 4 schematically illustrates a configuration of a distance sensor in accordance with Embodiment 1 of the present invention.

DESCRIPTION OF EMBODIMENTS

The following description will discuss embodiments of the present invention with reference to FIGS. 1 to 18. In the following descriptions, for convenience of description, members having functions identical to those described in a certain embodiment may be assigned identical referential numerals and their descriptions may be omitted.

Embodiment 1

(Optical Radar Apparatus)

Figure 1:
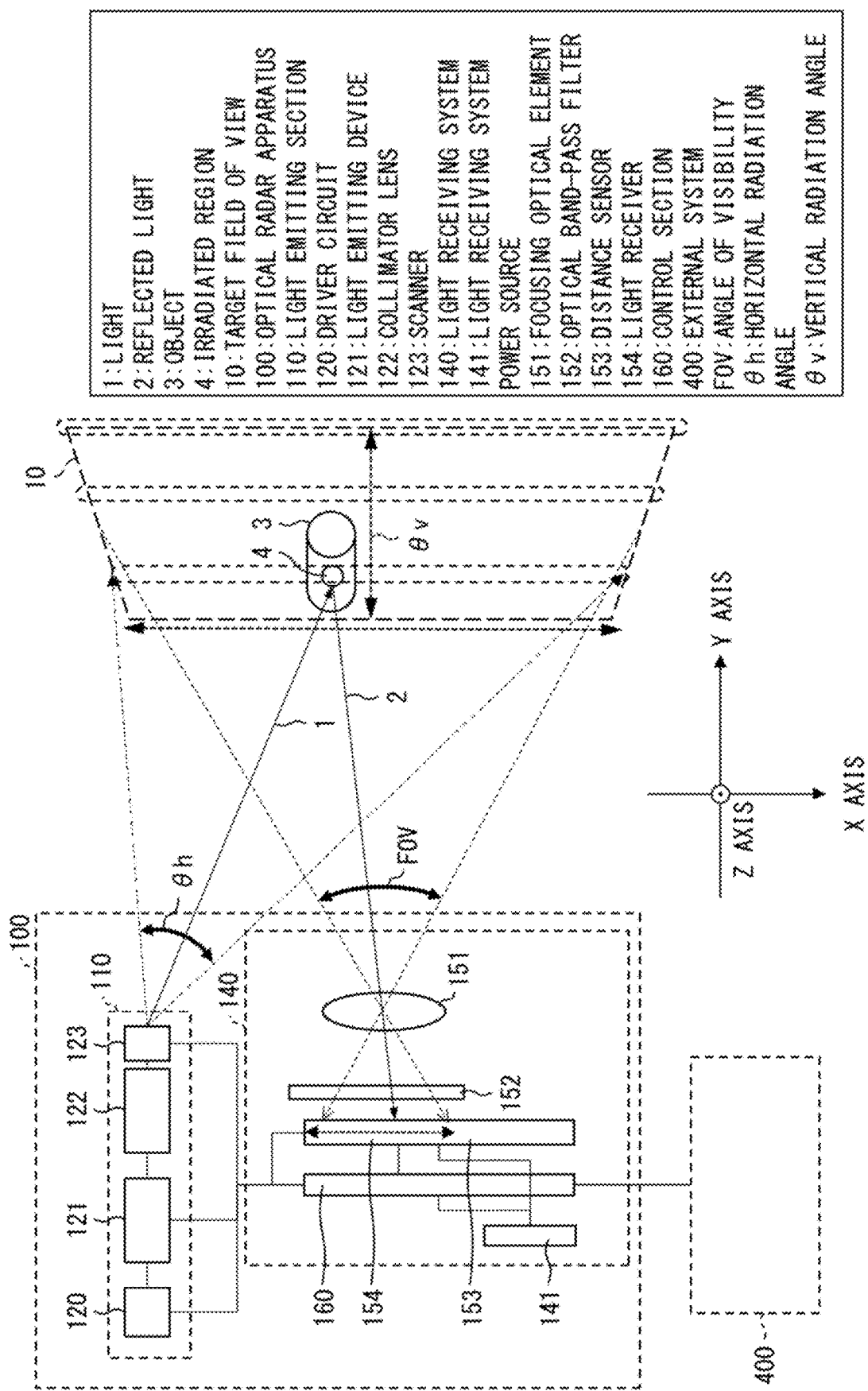
FIG. 1 schematically illustrates a configuration of an optical radar apparatus in accordance with Embodiment 1 of the present invention.

The following description will discuss a configuration of an optical radar apparatus 100 in accordance with Embodiment 1 of the present invention with reference to FIGS. 1 to 11. The following descriptions are based on a right-handed coordinate system in which the forward direction from the optical radar apparatus 100 is parallel to the Y axis and the direction perpendicular to the sheet on which each of the drawings of FIGS. 1 and 2 is shown is parallel to the Z axis. As illustrated in FIG. 1, the optical radar apparatus 100 includes: a light emitting section 110 configured to emit light 1 in the form of a spot toward an object 3; and a light receiving system 140 configured to receive reflected light 2 from the object 3 within a target field of view 10.

(Light Emitting Section)

The light emitting section 110 includes a light emitting device 121, a driver circuit 120 (which includes a power source), a collimator lens 122, and a scanner 123. The light emitting device 121 serves to emit light. The driver circuit 120 (which includes a power source) serves to pulse-drive the light emitting device 121. The collimator lens 122 serves to shape the light emitted by the light emitting device 121 into a spot. The scanner 123 serves to irradiate the entirety of the target field of view 10, which is defined by a vertical radiation angle θv and a horizontal radiation angle θh, with the light 1 by scanning the light 1 in the form of a spot in the X direction and the Z direction in a two-dimensional manner. Although the X direction is the horizontal direction and the Z direction is the vertical direction in general, this does not imply any limitation.

Assume here that the angle of deflection of the light 1 emitted by the light emitting section 110 in the X direction is referred to as a deflection angle θx, and the angle of deflection of the light 1 in the Z direction is referred to as a deflection angle θz. In a case where the center of the target field of view 10 is parallel to the Y axis, $-\theta h/2 \leq \theta x \leq \theta h/2$ and $-\theta v/2 \leq \theta z \leq \theta v/2$ are satisfied. Assume that, in cases where two or more kinds of light 1 should be distinguished between each other, each light 1 is represented as light B(s, t), where s is an integer that satisfies $0 \leq s \leq Sm$ and t is an integer that satisfies $0 \leq t \leq Tm$. In the X direction, the numbers 0 to Sm are allocated from left in the field of view 10, and, in the Z direction, the numbers 0 to Tm are allocated from bottom to top. Specific values of Sm and Tm are not intended to limit Embodiment 1.

In cases where Δθx and Δθz in the X direction and the Z direction each have a constant value, the deflection angles θx and θz of the light 1 are represented as below. The following is one example of a method of scanning of the light 1, and Embodiment 1 is not limited as such.

$$\theta x = -\theta h/2 + \Delta\theta x \cdot s \, (\Delta\theta x \cdot Sm = \theta h)$$

$$\theta z = -\theta v/2 + \Delta\theta z \cdot t \, (\Delta\theta z \cdot Tm = \theta v)$$

Assume that the distance from the optical radar apparatus 100 to the object 3 is a distance L and that the diameter of a region, of the object 3, which is irradiated with the light 1 (such a region is an irradiated region 4) is a diameter φ(L). The diameter φ(L) of the light 1 can be defined as below by a size P of an emission region that is a region, of the light emitting device 121, which actually emits light (such a size is the maximum diameter of the emission region seen in near field), a divergence angle η of the light emitting device 121, and a focal length fc of the collimator lens 122. Note, however, that it is assumed here that changes in divergence of the light 1 resulting from the scanner 123 are ignorable.

The diameter of light 1 at a position near the optical radar apparatus 100:

$$\varphi 0 = P + 2 \cdot fc \cdot \tan(\eta/2) (= 3.7 \text{ mm}) \quad \text{(Equation 1)}$$

The diameter of the irradiated region 4, which is irradiated with the light 1, of the object 3 positioned at the distance L from the optical radar apparatus 100 (at a position distant from the optical radar apparatus 100):

$$\varphi(L) = P \cdot L/fc + \varphi 0 \, (=1003.7 \text{ mm}) \qquad \text{(Equation 2)}$$

The numbers in each pair of parentheses each represent, as an example, the value obtained when fc=20 mm, η=10 degrees, P=200 μm, and L=100 m.

(Light Emitting Device)

It is necessary that light emitted by the light emitting device 121 travel a long distance while maintaining its intensity, and the diameter φ(L) is preferably smaller. In distant areas, the first term of the equation representing the diameter φ(L) is dominant, and therefore the size P is preferably smaller and the focal length fc is preferably longer. Note that "distant" means a case in which the second term of Equation 2 is sufficiently smaller than the first term of Equation 2, and therefore is assumed here to refer to cases in which φ0·fc/P/L<1/10 is satisfied (the second term is less than 1/10 of the first term, and therefore the margin of error is about 10% even if the second term is ignored). In the above example, L>3.7 m.

As the focal length fc increases, the value of the diameter φ0 increases (see Equation 1), resulting in an increase in diameter of light that is incident on the scanner 123. This makes it necessary to increase the size of the scanner 123 and causes cost increase. To avoid this, it is preferred to reduce the divergence angle q. Some other optical element (such as a normal lens or rod lens) may be provided between the light emitting device 121 and the collimator lens 122 to prevent or reduce the divergence of the light. Note that, if the focal length fc is increased, the diameter of the light 1 at a position near the optical radar apparatus 100 increases. This reduces the light intensity per unit area, and makes it easier to meet the requirements for Class 1 of laser safety standard. It follows that, by increasing the peak power of light, it is possible to measure longer distances, in some cases.

In cases where an edge emitting laser chip is used as the light emitting device 121, an emission region of the edge emitting laser chip is long in a direction parallel to an emission layer and is short in a direction perpendicular to the emission layer. The size P is the dimension in the direction parallel to the emission layer, and is usually substantially equal to a ridge width. Assuming that the dimension of the emission region in the direction perpendicular to the emission layer is a dimension U, the aspect ratio, P/U, of the emission region satisfies P/U>>1. In this case, the irradiated region 4 at a distant point is in the shape of an elongated oval. On the other hand, in a case where a surface emitting laser chip is used as the light emitting device 121, an emission region of the surface emitting laser chip often includes a plurality of laser emitting units. Therefore, the size P of the emission region is not the size of an aperture indicative of the size of a light emitting part of each of the laser emitting units, but is the maximum diameter of a collection of the plurality of laser emitting units. In cases of a surface emitting laser chip, the aspect ratio P/U is usually equal to or less than 1. In this case, the irradiated region 4 at a distant point is substantially in the shape of a circle. In order to be capable of detecting the object 3 at a distant point, it is necessary to increase the peak power of the light 1. Assuming equal power levels, the edge emitting laser is generally smaller in emission region than the surface emitting laser. Therefore, for the optical radar apparatus 100 arranged as described above, the edge emitting laser is more preferred as the light emitting device 121, because the edge emitting laser is capable of narrowing the irradiated region 4 on the distant object 3 and thus allows for higher resolution measurement. In a case where the optical radar apparatus 100 is installed in an automobile or the like, it is preferable that the longitudinal direction of the irradiated region 4 is parallel to the vertical direction, because it is important to achieve a high spatial resolution in the horizontal direction. To this end, it is preferable that the optical radar apparatus 100 is arranged such that an active layer of the edge emitting laser is in parallel to the vertical direction.

The light emitting device 121 is a device that emits light having a pulse whose width at half maximum is about one nanosecond to several hundreds of nanoseconds. The peak power of the pulse is in the range of from several watts to several hundreds of watts. The emission wavelength can be selected depending on the purpose of use, but is preferably an infrared wavelength in the range of from about 700 nm to about 1500 nm, because such a wavelength is advantageous in that it is invisible to human eyes and therefore does not intervene, and also because longer wavelengths are safer to animal eyes. Furthermore, longer wavelengths are more preferred, because the intensity of background light is also weak. In particular, the wavelength in the range of from about 940 nm to about 950 nm is preferred, because the background intensity is lowered because of absorption of sunlight by the moisture in the air. On the other hand, wavelengths of not greater than 1000 nm are advantageous in that an inexpensive silicon device can be used as a light receiver. The silicon device shows a higher quantum efficiency when the wavelength is shorter, and therefore the wavelength is most preferably in the range of from about 900 nm to about 950 nm in consideration of the grounds as described above.

It is preferable that the emission peak wavelength of the light emitting device 121 does not fluctuate much in response to temperature changes. The following arrangement, which is not illustrated in FIG. 1, may be employed: a temperature control circuit that serves to control the temperature of the light emitting device 121 is provided to prevent or reduce the fluctuation of the emission peak wavelength in response to temperature changes.

(Driver Circuit)

The driver circuit 120 causes electric current of a predetermined level to pass through the light emitting device 121 at predetermined points in time, and thereby cause the light emitting device 121 to emit light. The points in time at which the light is emitted are determined by a signal from a control section 160. The amount of the electric current may be changeable, and may be controlled by the control section 160. The same applies to changes in electric current over time that determine the duration of each emission of the light. The emission intensity of the light 1 is generally uniform throughout the target field of view; however, since a high detection sensitivity is obtained when light intensity is strong, in a case where a particular area in the target field of view 10 is to be carefully viewed, the intensity at and near that area can be increased. For example, the following arrangement can be employed: driving current is increased only in an area that corresponds to the road in front of the apparatus and thereby more distant objects 3 can be detected.

(Scanner)

The scanner 123 can be a mechanical mirror scanner that employs a galvanic mirror or some other mechanical mirror, but is preferably a non-mechanical scanner that employs a micro-electro-mechanical-system (MEMS) mirror device, an optical phased array antenna device, a liquid crystal polarization grating, or the like, because such a scanner 123 is advantageous in that the shock resistance of the optical radar apparatus 100 improves and thus long-term reliability improves and that size reduction is easy. A specific configuration of the scanner has already been known and therefore the details therefor are omitted here. The following description deals with an example in which an MEMS mirror device is used. The MEMS mirror device is, for example, a magnetic mirror. The deflection angle of the mirror is changed by controlling, through use of the control section 160, the amount of electric current caused to flow. In cases of an electrostatic mirror or a piezoelectric mirror, the deflection angle of the mirror can be changed by controlling, through use of the control section 160, the voltage applied. The control section 160 controls the deflection angle of the mirror and the light receiving system 140 in synchronization with each other such that a signal that the object 3 emits upon irradiation with the light 1 can be detected. The same is carried out also when the scanner 123 employs some other kind of scanning method. According to the MEMS mirror device, the light 1 does not diverge to a great extent, provided that the mirror surface is flat.

(Light Receiving System)

The light receiving system 140 at least includes: a distance sensor 153, a focusing optical element 151, an optical band-pass filter 152, the control section 160, and a light receiving system power source 141. The distance sensor 153 serves to measure the distance to an object by time-of-flight measurement. The control section 160 serves to control the distance sensor 153, the light emitting section 110, and the like and communicate with an external system 400. The light receiving system power source 141 supplies power to the light receiving system 140.

The scanner 123 scans the target field of view 10 with the light 1; however, the light receiving system 140 is physically secured to the optical radar apparatus 100, and does not move in correspondence with the scanned light 1. As such, reflected light 2 from the target field of view 10 is projected through the focusing optical element 151 onto a point, on the light receiver 154, which changes in position as the scanning proceeds.

(Focusing Optical Element)

The focusing optical element 151 may be constituted by a reflecting mirror, but is generally a lens; therefore, the following description deals with an arrangement in which the focusing optical element 151 is a lens. Assuming that the focal length of the focusing optical element 151 is fd and the F-number of the focusing optical element 151 is F, the effective aperture diameter of the focusing optical element 151 is represented as fd/F. In order to carry out distance measurement with respect to the entirety of the target field of view 10, it is necessary that the entirety of the target field of view 10 be projected through the focusing optical element 151 onto the light receiver 154. Assuming that the dimensions of the target field of view 10 projected on the light receiver 154 are Ix and Iz, the following relationships hold.

$Ix = 2 \cdot fd \cdot \tan(\theta h/2)$ $Iz = 2 \cdot fd \cdot \tan(\theta v/2)$ For example, in a case where fd=24 mm, θh=24 degrees, and θv=12 degrees, the dimension Ix is 10.2 mm and the dimension Iz is 5.0 mm. The dimensions in the X and Z directions of the light receiver 154 are preferably greater than Ix and Iz, respectively (preferred dimensions of the light receiver 154 will be described later).

The intensity of the reflected light 2 converged on the light receiver 154 is in proportion to the area of the effective aperture of the focusing optical element 151, and therefore is in proportion to the square of the effective aperture diameter fd/F. In order to enable measurement of longer distances, it is necessary that reflected light 2 from distant points be converged effectively, and therefore the F-number is preferably small. In the above example, assuming that F=1.2, the effective aperture diameter is 20 mm, which means that the area of the effective aperture of the focusing optical element 151 is about 100 times greater than that of an MEMS mirror that is about several millimeters in size. In general, the light emitting surface of a non-mechanical-scanning-type scanner 123 is about several millimeters; therefore, regardless of whether the scanner is an MEMS mirror or not, the same results are achieved in a case of the non-mechanical-scanning-type scanner 123. Thus, the use of the focusing optical element 151 makes it possible to dramatically improve the detection sensitivity as compared to when the reflected light 2 is received directly through the scanner 123.

The diameter of each projection region 4A, which is a region where a corresponding irradiated region 4 is projected through the focusing optical element 151, on the light receiver 154 is represented by the following equation.

$$\begin{aligned} I\varphi(L) &= \varphi(L)/L \cdot fd \quad (=0.24 \text{ mm}) \\ &= P \cdot fd/fc + \varphi 0 \cdot fd/L \end{aligned}$$ (Equation 3)

The number in parentheses indicates the value obtained when η=10 degrees, fc=20 mm, P=0.2 mm, L=100 m, and fd=24 mm. At distant points, the second term of the equation representing the diameter Iφ(L) is ignorable, and therefore Iφ(L), P·fd/fc. That is, in regard to distant objects, the diameter Iφ(L) is a constant value that depends on the size P of the emission region of the light emitting device 121 and on the ratio (fd/fc) between the focal lengths of the focusing optical element 151 and the collimator lens 122, irrespective of the distance L. Thus, provided that the focal lengths fd and fc are not dramatically different from each other, it can be understood that the diameter Iφ(L) is on the order of about the size P.

Figure 3:
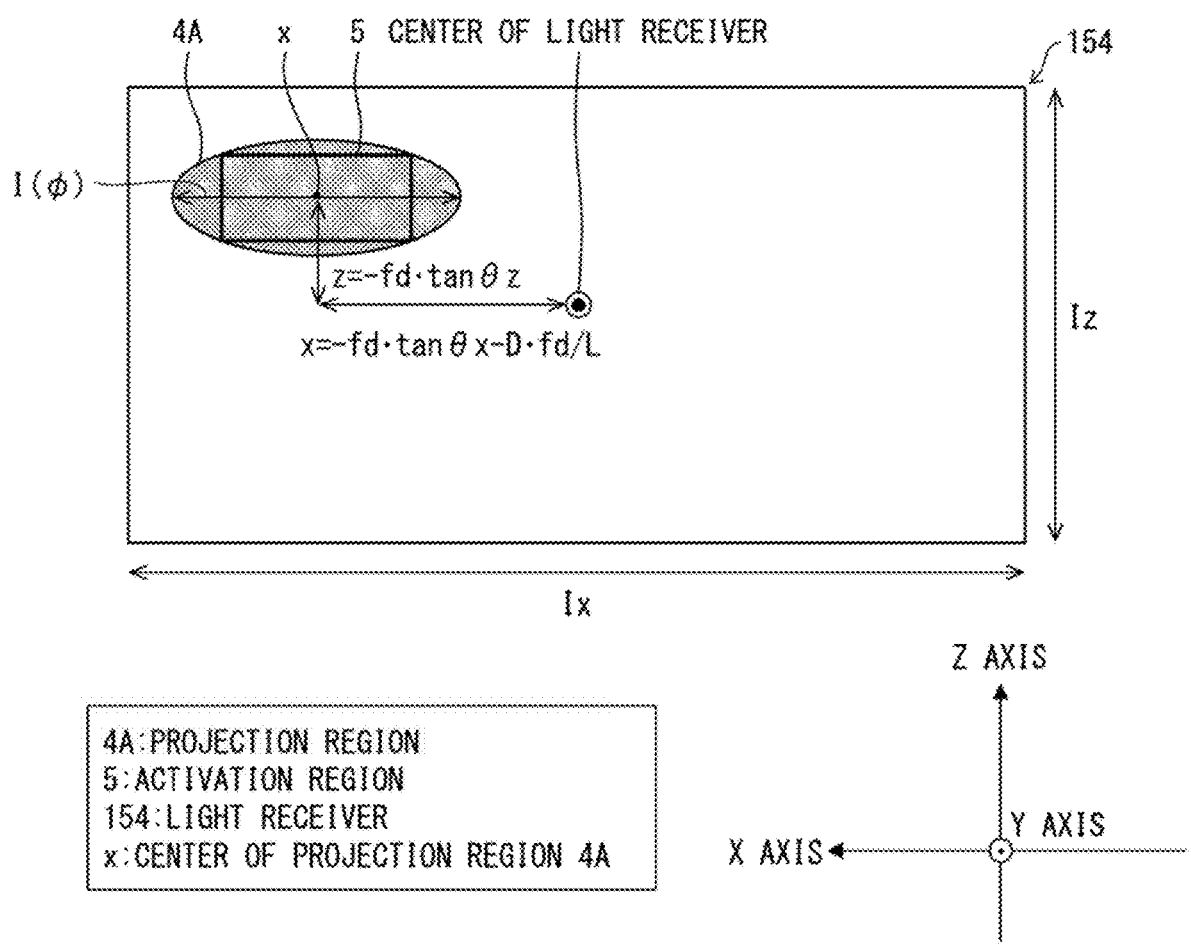
FIG. 3 schematically illustrates a light receiver of the optical radar apparatus in accordance with Embodiment 1 of the present invention.

In the optical radar apparatus 100, the central optical axis of the scanner 123 and the optical axis of the focusing optical element 151 are spaced from each other by a certain distance so as not to overlap each other. The following description deals with an arrangement in which both are spaced from each other by a distance D in the X direction. As illustrated in FIG. 2, when light (indicated by "1a", "1b", "1c") moves from an irradiated region 4a to a irradiated region 4b and then from the irradiated region 4b to a irradiated region 4c as scanning proceeds, the position of a projection region 4A, which is a region where an irradiated region is projected through the focusing optical element 151 onto the light receiver 154, also moves from a projection region 4Aa to a projection region 4Ab and then from the projection region 4Ab to a projection region 4Ac on the light receiver 154. The coordinates of the center of each projection region 4A on the light receiver 154, to which the reflected light 2 (light B(s, t) that struck the object 3 positioned at a distance L and was reflected at the object 3) is projected, can be represented by the following equations, as illustrated in FIG. 3. Assume here that the center of the light receiver 154 coincides with the optical axis of the focusing optical element 151.

$x = -fd \cdot \tan \theta x - D \cdot fd/L$ (Equation 4)

$$z = -fd \cdot \tan \theta z \quad \text{(Equation 5)}$$

Note here that the value of the second term (represented as W) of Equation 4 is so large that it cannot be ignored at short distances. For example, assume that D=20 mm and fd=24 mm. In this case, if L is 10 m, then W is 48 μm, whereas, if L is 2 m, then W is 240 μm, which means that the second term is on the same order as the diameter Iφ(L) shown in Equation 3. That is, as illustrated in FIG. 2, even if the same light 1a (B(s, t)) is emitted, the reflected light 2a and reflected light 2d from objects 3a and 3d at different distances L will form projection regions 4Aa and 4Ad, respectively, at different positions on the light receiver 154.

When the light B(s, t) is scanned, the projection region 4A moves within the light receiver 154. In order to be capable of always detecting the reflected light 2 from a direction falling within the horizontal radiation angle θh and the vertical radiation angle θv, it is necessary that the dimensions of the light receiver 154 be equal to or greater than the following dimensions.

$$\text{Dimension in } X \text{ direction:} Ix + D \cdot fd/L\min + I\varphi(L\min) + 2 \cdot Rx \quad \text{(Equation 6)}$$

$$\text{Dimension in } Z \text{ direction:} Iz + I\varphi(L\min) + 2 \cdot Rz \quad \text{(Equation 7)}$$

In the equations, Lmin represents the minimum measurable distance, Ix and Iz represent the range within which the center of the projection region 4A moves as scanning proceeds, Iφ(Lmin) represents the maximum size of the projection region 4A, D·fd/Lmin represents the amount of displacement of the projection region 4A when the object is at the minimum measurable distance, and 2·Rx and 2·Rz each represent a margin for compensation of assembly error of the optical radar apparatus 100. That is, in cases where the assembly error between the scanning central axis of the scanner 123 and the optical axis of the focusing optical element 151 is ±Rx in the X direction and ±Rz in the Z direction, the light receiver 154 is required to have margins, that is, the light receiver 154 is required to be larger by 2·Rx in the X direction and by 2·Rz in the Z direction.

As such, the dimension of the light receiver 154 in a direction parallel to a line connecting the scanner 123 and the focusing optical element 151 is preferably greater than the dimension Ix of the target field of view 10 projected on the light receiver 154 through the focusing optical element 151 by (i) the size (Iφ(Lmin)) of the projection region corresponding to the irradiated region on the object located at the minimum measurable distance and (ii) a value (D·fd/Lmin) obtained by multiplying the distance between the optical axes of the scanner 123 and the focusing optical element 151 by the ratio between the focal length of the focusing optical element 151 and the minimum measurable distance, and it is more preferred that a value corresponding to assembly error is further added. The dimension of the light receiver 154 in a direction perpendicular to the line connecting the scanner 123 and the focusing optical element 151 is preferably greater than the dimension Iz of the target field of view 10 projected on the light receiver 154 through the focusing optical element 151 by the size (Iφ(Lmin)) of the projection region corresponding to the irradiated region on the object located at the minimum measurable distance, and it is more preferred that a value corresponding to assembly error is further added.

(Activation Region)

The total area of the light receiver 154 is much larger than the area of each projection region 4A; therefore, if the entirety of the light receiver 154 is activated, light that is incident on a position outside the projection region 4A is also detected unintentionally. Light that is incident on a position outside the projection region 4A is background light that has been reflected at something other than the irradiated region 4, i.e., noise. Therefore, in order to increase the S/N ratio, it is necessary that only the portion, of the light receiver 154, which overlaps the projection region 4A be activated. A region to be activated, of the light receiver 154, which corresponds to a projection region 4A is referred to as an activation region 5. As seen in FIG. 3, it is preferred that the activation region 5 is contained in the projection region 4A or the activation region 5 is smaller than the projection region 4A.

(Optical Band-Pass Filter)

The optical band-pass filter 152 is preferably disposed in front of the light receiver 154. By adding the optical band-pass filter 152 that has a passable wavelength range of from several nanometers to several tens of nanometers centered on the wavelength of the light 1, it is possible to reduce the amount of a component, of the reflected light 2, which results from background light other than the light 1, and thus possible to improve the S/N ratio. The optical band-pass filter 152 may be contained in the focusing optical element 151 or may be disposed in front of the focusing optical element 151. The optical band-pass filter 152 may alternatively be disposed in a package of the distance sensor 153.

(Distance Sensor)

FIG. 4 illustrates a configuration of the distance sensor 153 of the optical radar apparatus 100. The light receiver 154 is comprised of a plurality of single photon avalanche diodes (SPADs) (i, j) arranged in an array of n rows×m columns. In Embodiment 1, the SPADs (i, j) are selected on a row-by-row and column-by-column basis (the details of this arrangement will be described later). In other words, the activation region 5 is set on a row-by-row and column-by-column basis in an array. The light receiver 154 activates only SPADs (i, j) which reside within the activation region 5 that overlaps the projection region 4A in accordance with scanning of the light 1, and thereby is always able to cover the projection region 4A with the smallest necessary number of SPADs (i, j). As such, it is possible to keep high S/N ratio because unnecessary background light is not received, and possible to increase the maximum measurable distance. Note that, although the light receiver 154 in Embodiment 1 is comprised of an array of SPADs, the light receiver 154 may be comprised of an array of some other light detection elements. For example, the light detection elements may be avalanche photodiodes. The light detection elements constituting the light receiver 154 are not limited to a particular kind.

According to this arrangement, when SPADs (i, j) disposed on an Si substrate are used, a large-scale array can be produced easily. The distance sensor 153 may be constituted by a single chip or a plurality of chips. For example, the distance sensor 153 may be formed by: providing the light receiver 154 on a first wafer and other parts on a second wafer; and bonding the first and second wafers together. Alternatively, the following configuration may be employed: the photodiode portions of the light receiver 154 are formed on a compound semiconductor substrate; transistors Tr, pulse output circuits 96, and the like are provided together with other circuits on another Si substrate; and both substrates are bonded together to function. Such a configuration can be used in cases where an infrared ray that has a wavelength of 1070 nm or longer, which cannot be detected by the photodiodes made of Si, is used as the light 1.

The number of SPADs (i, j) in the activation region 5 is preferably as much as possible, and is preferably at least 50, more preferably 100 or more. Once a single SPAD receives light, the SPAD cannot receive light during deadtime (10 nsec to 100 nsec); therefore, the average number of photons received by each SPAD during the deadtime is preferably less than one. As such, use of a large number of small-area SPADs makes it possible to improve light detection efficiency and to improve distance measurement accuracy as compared to using a small number of large-area SPADs.

(Row Selection Circuit and Column Selection Circuit)

The distance sensor 153 includes a column selection circuit 91 and a row selection circuit 90 which serve to select rows and columns contained in the activation region 5. The SPADs (i, j) are connected to the column selection circuit 91 by column selection lines Cj, and are connected to the row selection circuit 90 by row selection lines Ri. Only SPADs (i, j) that are in connection with activated column selection lines Cj and row selection lines Ri are brought into a measurable state and detect photons they receive, and other SPADs (i, j) do not detect photons and do not contribute to the measurement at all. As such, detection of unwanted background light can be avoided. The SPADs (i, j) are connected to column counters CTj by column signal lines OCj. Each of the column counters CTj is a binary counter that counts the number of pulses that each SPAD (i, j) connected thereto generates upon detection of a photon and sums the numbers, and outputs the sum Nj of the numbers of photons detected by SPADs in the j-th column during a measurement period. The column counters CT1 to CTm are connected to a summing circuit 92, and the output of the summing circuit 92 is connected to a distance measurement unit 93. After the end of a measurement period, an output of each column counter CTj is read by the summing circuit 92. The summing circuit 92 calculates the total sum ($\Sigma Nj = N1 + N2 + \ldots Nm$) of the outputs Nj of the counters CTj, and supplies the result to the distance measurement unit 93. Every time the readout is carried out, the column counters CT1 to CTm and the summing circuit 92 are reset.

The above action is carried out after a certain period of time $\Delta T$ after each emission of the light 1, and the total sums $\Sigma Nj$ of respective periods are accumulated in the distance measurement unit 93 in chronological order. Assuming that the l-th (l is an integer of 0 to 1m) total sum $\Sigma Nj$ is $N(l)$, the total sum $N(l)$ is the number of photons detected by the light receiver 154 during the period $\Delta T$ from when a period T (=$\Delta T \cdot l$) has passed after the emission of a pulse. Tmx (=$\Delta T \cdot 1m$) is the longest time-of-flight, and Tmx·c/2 (c: speed of light) is the maximum measurable distance. The distance measurement unit 93 calculates a time-of-flight from the recorded total sum $N(l)$. A method of the calculation will be described later.

According to this arrangement, the column counters CTj are provided so as to correspond to respective columns; however, one binary counter may be provided so as to correspond to two or more columns. Note, however, that, in a case of an arrangement in which the outputs from a large number of columns are to be counted by a single binary counter, a counting loss is more likely occur; therefore, depending on the number of counts in each column, the arrangement needs to be configured such that the counting loss of pulses is minimized.

In the above description, the binary counters are employed as the column counters CTj which are circuits to count, in time sequence, the number of pulses that are generated upon detection of photons by the activation region 5. A reason therefor is that this arrangement can be achieved with use of relatively simple circuits and, when achieving this arrangement with an integrated circuit, the function of counting and summing can be achieved with a small area. Another reason is that, because the binary counter is a simple logic circuit, it is easy to achieve a wide operation margin and allows for easy design. The binary counter is advantageous in such aspects; however, a circuit to count the number of pulses does not necessarily have to be a plurality of binary counters.

The distance sensor 153 includes a control circuit 94 which serves to control the above-described various functions of the distance sensor 153 and carry out timing control of the functions. The control circuit 94 may include a CPU, RAM, a nonvolatile memory, and/or the like. Note that, since Embodiment 1 uses a time-of-flight measurement to measure distances, the optical radar apparatus 100 is configured to emit light 1 and the distance sensor 153 has the function of measuring a ToF. However, in cases where a frequency modulation is used to measure distances, the light emitted by the optical radar apparatus 100 is light that is constant in intensity and that varies continuously in wavelength, and thus the light emitted by the optical radar apparatus 100 is not limited to simple light pulse.

(SPAD)

Figure 5:
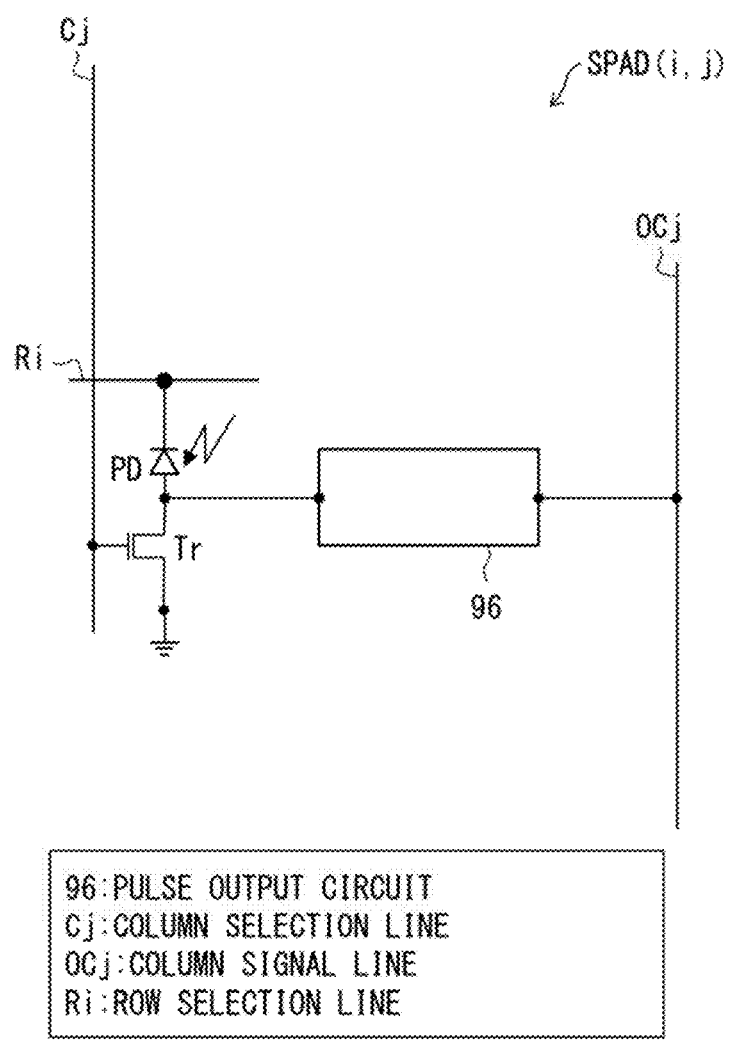
FIG. 5 schematically illustrates a configuration of an SPAD constituting the light receiver in accordance with Embodiment 1 of the present invention.

An SPAD (i, j) includes, as illustrated in FIG. 5, a photodiode PD, a transistor Tr, and a pulse output circuit 96. The photodiode PD) is supplied with power from a corresponding row selection line Ri. The gate electrode of the transistor Tr is connected to a corresponding column selection line Cj, and only an SPAD(s) (i, j) whose connected row selection line(s) Ri is/are in connection with a power source and thereby whose connected column selection line(s) Cj is/are turned on is/are brought into a photon detectable mode and activated. Embodiment 1 employs a passive quenching mode, and the on-resistance of the transistor Tr serves also as a resistance for quenching. In cases of active quenching, some other circuit configuration is employed. The pulse output circuit 96 is a circuit that outputs a pulse with a certain time duration to a corresponding column signal line OCj upon detection of a photon by the photodiode PD. In FIG. 5, the transistor Tr resides between the photodiode PD and GND: however, the transistor Tr may reside between the photodiode PD and a high-voltage power source. The transistor Tr is not limited to an NMOS transistor and may be a PMOS transistor.

Figure 6:
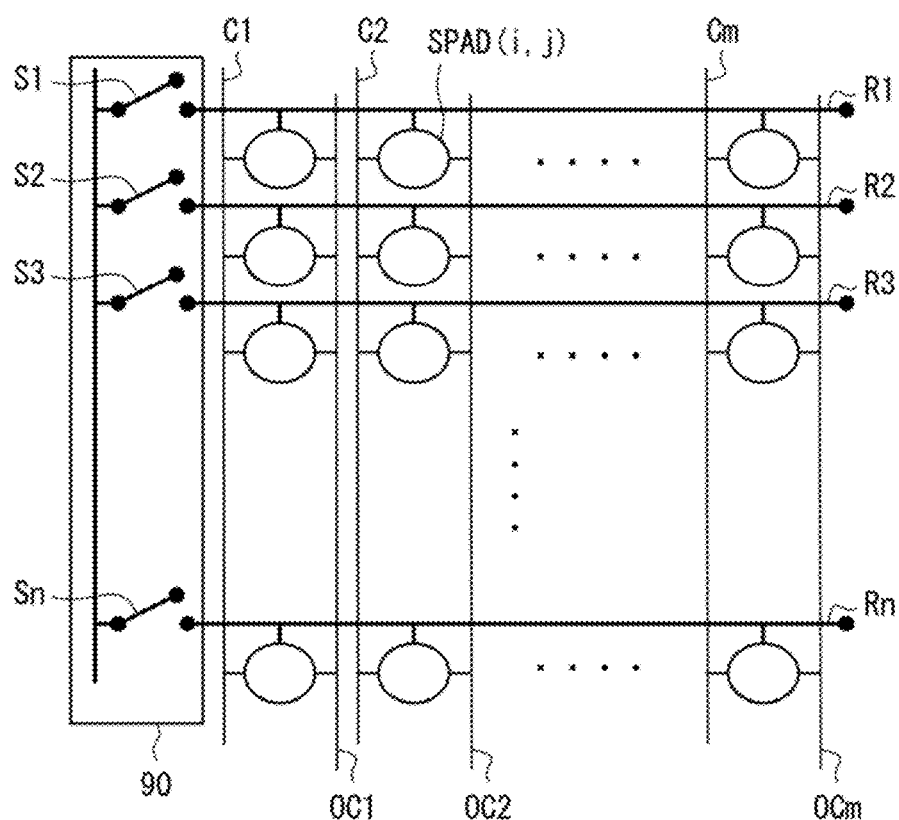
FIG. 6 schematically illustrates a configuration of an SPAD array constituting the light receiver in accordance with Embodiment 1 of the present invention.

The row selection circuit 90 includes, for example: switches S1 to Sn by which a power source VSPAD for the SPADs is connected to respective row selection lines Ri; and a circuit that controls the switches Si (see FIG. 6). The row selection circuit 90 is capable of bringing any combination of switches Si into ON state. Similarly, the column selection circuit 91 includes: switches by which any column signal line(s) Cj is/are activated; and a control circuit that controls the switches. In the circuit of an SPAD (i, j) shown in FIG. 5, the transistor Tr is constituted by an NMOS-FET; therefore, when a column signal line Cj is set at H level, the SPAD (i, j) is activated.

Selection Example 1

Figure 7:
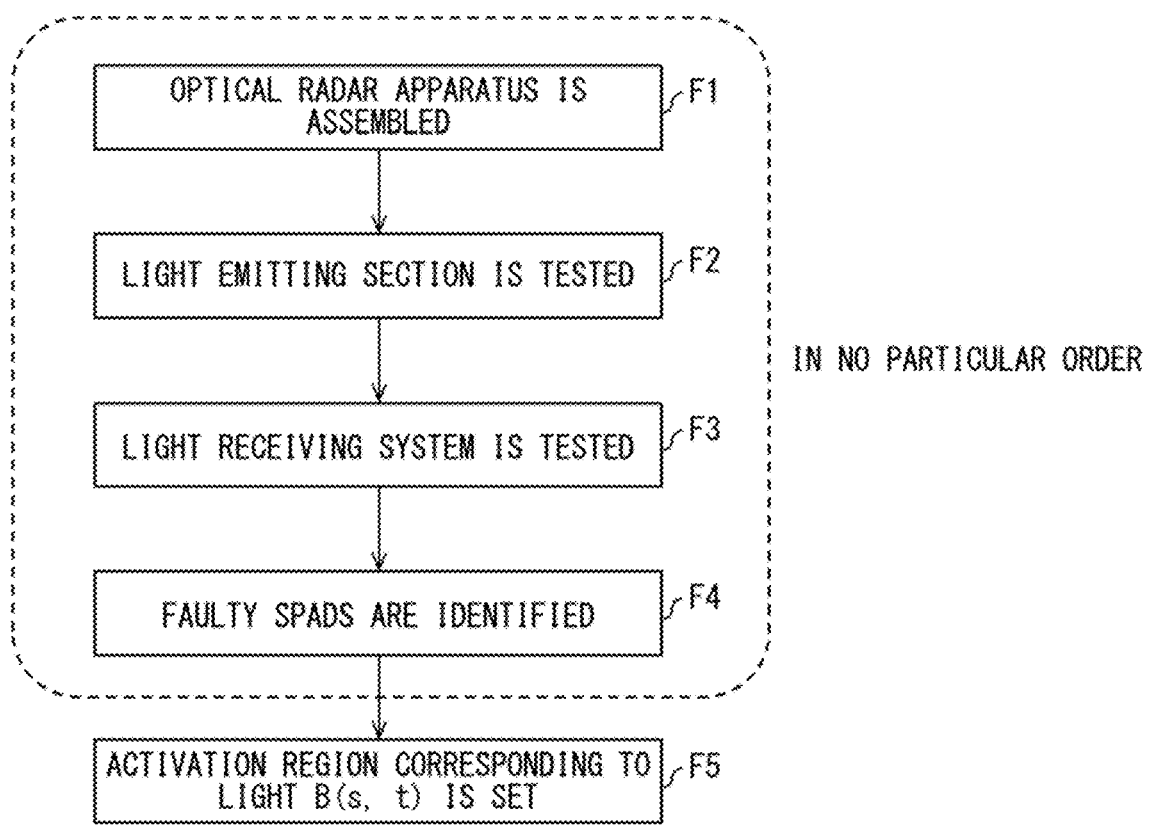
FIG. 7 schematically shows a flow of setting up the optical radar apparatus in accordance with Embodiment 1 of the present invention.
Figure 8:
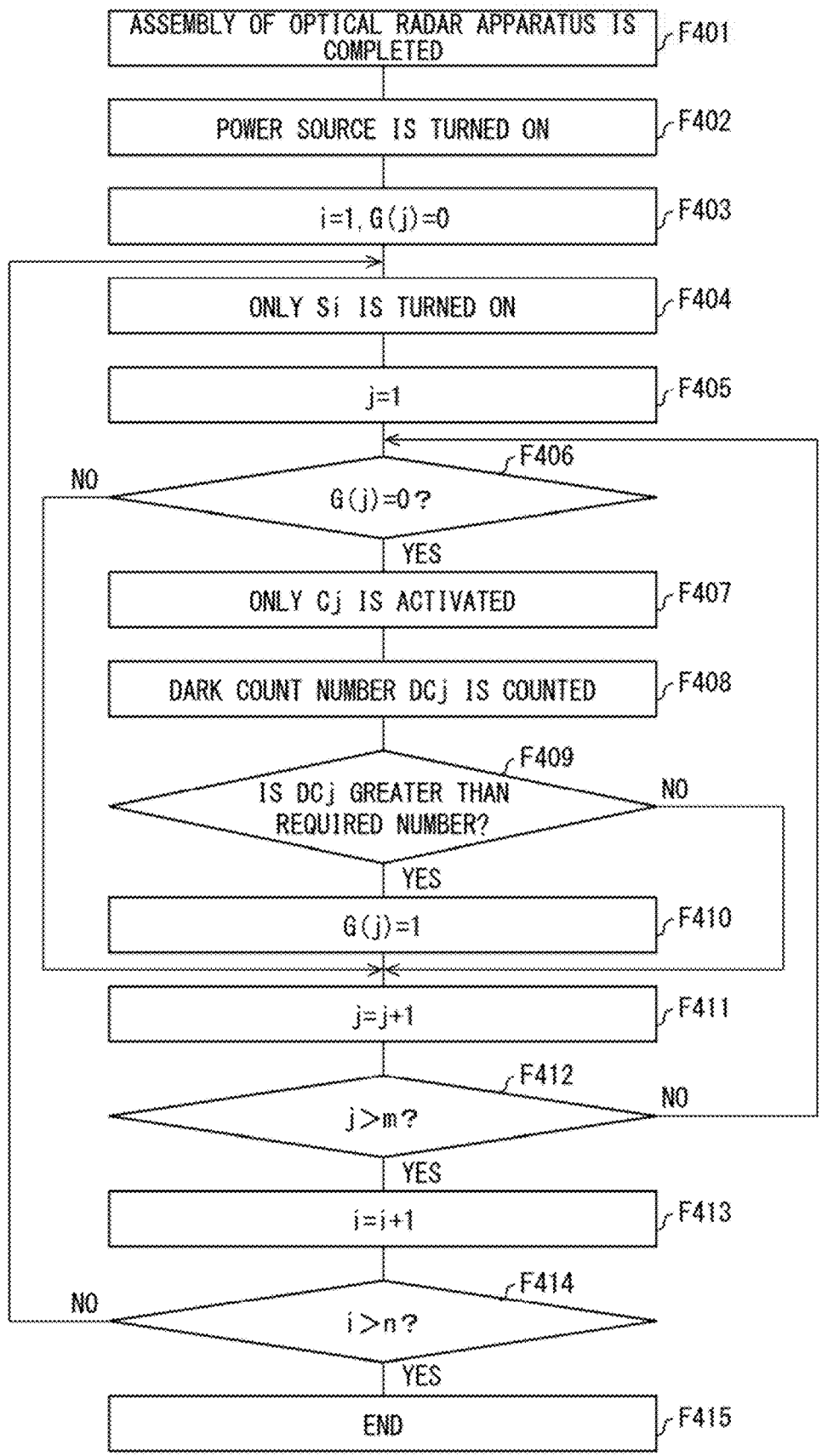
FIG. 8 schematically shows a step of excluding faulty SPADs in the light receiver in accordance with Embodiment 1 of the present invention.
Figure 9:
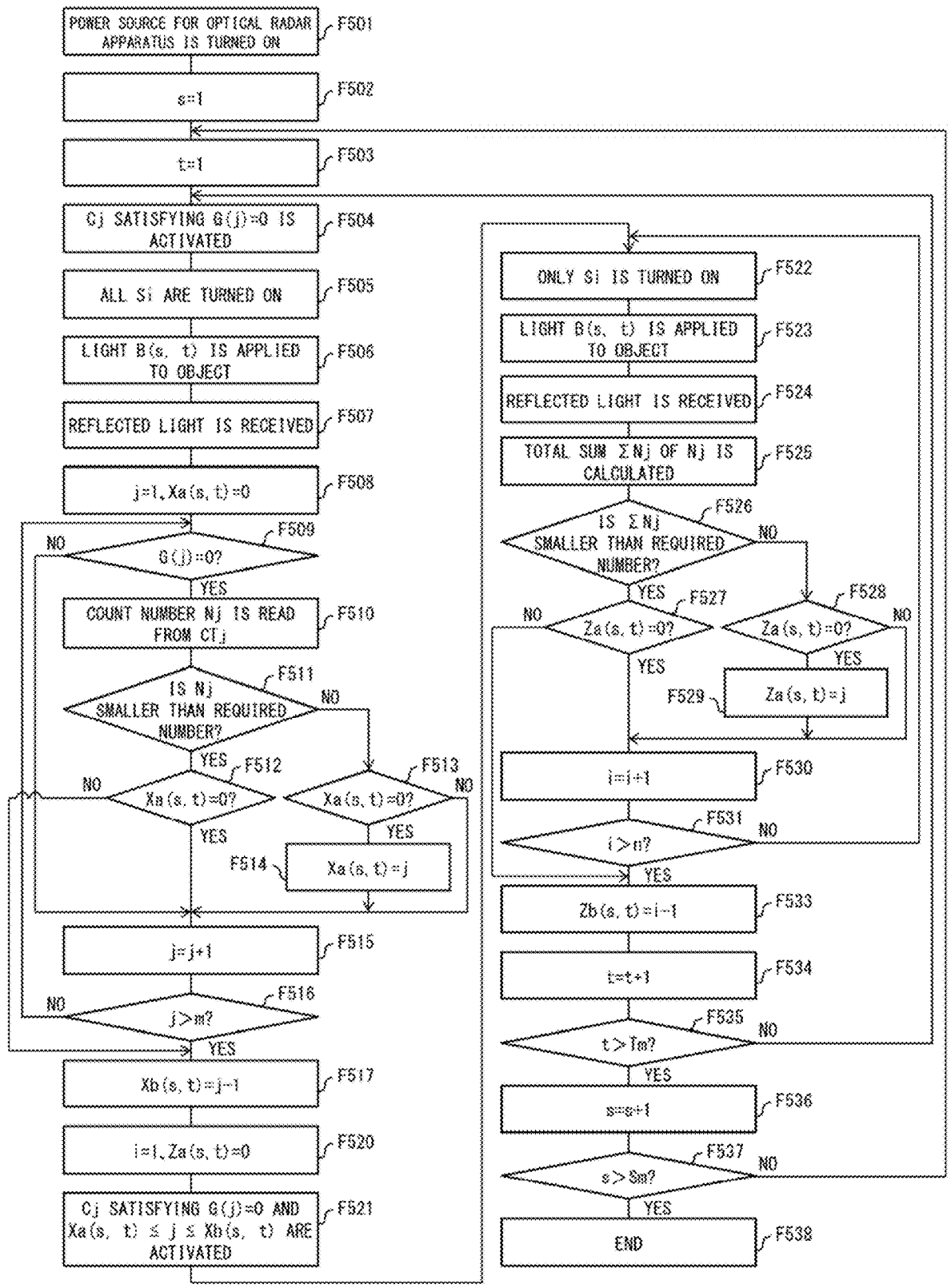
FIG. 9 schematically shows a step of selecting to-be-activated columns and rows in the light receiver in accordance with Embodiment 1 of the present invention.

The following description will discuss an example of selection of SPADs (i, j) to be activated, under the conditions in which an object is positioned at a certain distance, with reference to flows illustrated in FIGS. 7 to 9. As described earlier, the position of the projection region 4A on the light receiver 154 differs between cases of long distance and short distance. One way to address this would be to select to-beactivated SPADs (i, j) for the case of short distance and for the case of long distance and use the sum of the areas of the selected SPADs (i, j) as an activation region. However, if the activation region is configured to cover the entire projection region 4A for short distance, such an activation region is large, and this may increase background light noise when carrying out long-distance measurement and may lead to a decrease in maximum measurable distance. To address this, the configuration of the activation region 5 needs to be optimized in consideration of, for example, whether an increase in maximum measurable distance is more important, to what extent the accuracy of short-distance measurement is important, or the like factor.

FIG. 7 shows an overall flow, and FIGS. 8 and 9 show the details of the flow. The optical radar apparatus 100 is assembled (step F1), and a step of testing light emission from a light emitting device (step F2), a step of testing a light receiving system (step F3), and a step of identifying a faulty SPAD(s) (step F4) are carried out. Note that steps F1 to F4 may be carried out in any order. Steps F1 to F4 may be automatically carried out by an assembling apparatus and a testing apparatus or may be semi-automatically (partially manually) carried out by an operator. The same applies to steps contained in the following flows.

In step F2, whether or not the light emitting section emits light 1 as required is tested. In step F3, whether circuits in the distance sensor 153 operate normally is tested (detection characteristics of each SPAD are not tested here).

(Evaluation of Characteristics of SPADs)

In step F4, the characteristics of SPADs, mainly in dark condition, are evaluated. The details of the test are shown in FIG. 8. In this evaluation, care should be taken so that light does not enter the light receiver 154.

First, the optical radar apparatus 100 is assembled by a user (step F401), and a power source is turned on (step F402). Memories G(1) to G(m) are each a single-bit memory. If G(j)=0, the j-th column can be used, whereas, if G(j)=1, the j-th column cannot be used. The memories G(j) are stored in a memory 95 described later.

Next, in the optical radar apparatus 100, in the initial state, all the memories G(j) are set to 0, and "i" that indicates a to-be-selected row is set to 1 (step F403).

Next, a switch Si is turned on by the row selection circuit 90 (step F404).

Steps F405 to F412 form a loop that sequentially tests the first to m-th columns.

First, in step F405, the first column is selected by the column selection circuit 91.

Next, in steps F406 and F407, if G(j)=0, the column selection line Cj is activated by the column selection circuit 91.

Next, in steps F408 to F411, an SPAD (i, j) is activated by the aforementioned process, and pulse outputs in dark condition are summed by the column counter CTj. Then, in the optical radar apparatus 100, whether the sum DCj is greater or smaller than the required value is determined. If it is determined that the sum DCj is greater than the required value, the SPAD (i, j) is not usable, and therefore G(j) is set to 1. If it is determined that the sum DCj is less than the required value, this means that there is no problem; therefore, the to-be-selected column number j is incremented by 1 and the process proceeds to step F406 when new column number j is not larger than m as shown in step F412.

After all the columns in the i-th row have been tested by the loop of steps F405 to F412, in steps F413 to F414, the to-be-selected row number i is incremented by 1, and the process proceeds to step F404 for the next row. If the to-be-selected row number i has exceeded n, the test ends (the process proceeds to END in step F413).

The above arrangement is configured such that, in cases where there is at least one SPAD (i, j) whose dark count number is greater than the predetermined number (in other words, a faulty SPAD) in a j-th column, the entirety of the j-th column is not used. Such a continuous flow is controlled by the control circuit 94. If there is an SPAD whose dark count number is greater than the predetermine number, the number of signals from the corresponding column increases, and this may be undistinguishable from a signal resulting from incidence of the reflected light 2. Therefore, the step of testing the dark count number (step F4) needs to be completed before step F5. With this, any SPAD that cannot be used for detection can be excluded, and this makes it possible to avoid fluctuations in amount of light received by the light receiver 154 of the optical radar apparatus 100 and to improve detection accuracy.

Note that the term "faulty SPAD (faulty part)" herein refers to a light detection element (SPAD) that initially has some fault and that is unable to detect incident photons even when brought into the condition in which it is supposed to be activated.

(Selection of Activation Region)

Next, the step of selecting the activation region 5 corresponding to light B(s, t) (step F5) is discussed with reference to FIG. 9. The following combinations of s and t are determined: Xa(s, t), Xb(s, t), Za(s, t), and Zb(s, t). Here, j columns which satisfy Xa(s, t)≤j≤Xb(s, t) and i rows which satisfy Za(s, t)≤i≤Zb(s, t) constitute an activation region 5 corresponding to the light B(s, t). In other words, the distance sensor 153 sets one activation region 5 for each scanning direction (for each light B(s, t)).

First, the power source for the optical radar apparatus 100 is turned on (step F501), and then the following flow is carried out with respect to each set of s and t. Note that it is preferable that this step is carried out in dark condition so that light other than the light emitted by the optical radar apparatus 100 will not be incident on the light receiver 154.

Next, in steps F504 to F507, on the basis of G(j) obtained as a result of step F4, only column selection lines Cj in j-th columns that satisfy G(j)=0 are activated by the column selection circuit 91. In other words, the activation region 5 does not contain any faulty part. The row selection circuit 90 brings all the switches Si into ON state. In this condition, light B(s, t) is applied to an object, and reflected light 2 is received. In so doing, the number of detected photons resulting from the reflected light 2 is recorded in each of the column counters CTj for the activated j-th columns.

In steps F508 to F517, the results of counts by the column counters CTj are read by the column selection circuit 91, and a column(s) in which any of the counted numbers is greater than the required value is/are selected. This makes it possible to exclude columns which are not reached by the reflected light 2.

First, in step F508, the initial settings are made as follows: j=1 and Xa(s, t)=0.

Next, in step F509, only j-th columns that have passed the test in step F4 are selected.

Next, in step F510, the number of counts Nj is read from each column counter CTj.

Next, in step F511, if the number of counts Nj is less than the required value, whether Xa(s, t) is 0 or not is determined in the next step (step F512). If Xa(s, t) is 0 (Yes), this means that a to-be-activated column is far from being reached, and therefore the process proceeds to F515 for the next column. If Xa(s, t) is not 0 (No), this can be regarded that the to-be-activated column was once reached and then a not-to-be-activated column is reached again, and therefore Xb(s, t) is set in step F517 and the process proceeds to step F520. If the number of counts Nj is greater than the required value in step F511, whether Xa(s, t) is 0 or not is determined in the next step (step F513). If Xa(s, t) is 0 (Yes), this implies that the to-be-activated column has been reached for the first time, and therefore Xa(s, t) is set to j in step F514, and the process proceeds to the next column via step F515. If Xa(s, t) is not 0 (No), this can be regarded that this column is within the activation region 5, and therefore the process proceeds to the next column via step F515. In step F515, the to-be-selected column number j is incremented by 1, and, if the to-be-selected column number j is equal to or less than m (step F516), the process proceeds to step F509. In this way, the range of columns in which the dark count number is not more than the predetermined number and in which the reflected light 2 can be detected is defined as extending from j=Xa(s, t) to j=Xb(s, t).

Next, the following describes a selection of rows that belong to the activation region 5.

First, in step F520, the row selection circuit 90 carries out initial settings as follows: a to-be-selected row i=1 and Za(s, t)=0.

Next, in step F521, the column selection circuit 91 activates only columns which satisfy G(j)=0 and Xa(s, t)≤j≤Xb(s, t), on the basis of the G(j), Xa(s, t), Xb(s, t) obtained in the preceding tests.

In the loop from step F522 to step F533, light B(s, t) is applied on a row-by-row basis, and whether or not reflected light 2 is received by each row is tested.

First, in steps F522 to F524, only the switch Si for the selected i-th row is turned ON by the row selection circuit 90, light B(s, t) is applied to an object, and reflected light 2 is received.

Next, in step F525, the sum Nj is read from each column's column counter CTj, and the total sum ΣNj is calculated by the summing circuit 92.

Next, in step F526, whether the total sum ΣNj is greater or less than the required value is determined. If it is determined that the total sum ΣNj is less than the required value, whether Za(s, t) is 0 or not is determined in the next step (step F527). If it is determined that Za(s, t) is 0 (Yes), this means that a to-be-activated row is far from being reached, and therefore the process proceeds to step F530 for the next row. If it is determined that Za(s, t) is not 0 (No), this can be regarded that the to-be-activated row was once reached and then a not-to-be-activated row was reached again, and therefore Xb(s, t) is set in step F533 and the process proceeds to step F534. If it is determined in step F526 that the total sum ΣNj is greater than the required value, whether Za(s, t) is 0 or not is determined in the next step (step F528). If it is determined that Za(s, t) is 0 (Yes), this implies that the to-be-activated row has been reached for the first time, and therefore Za(s, t)=i is set in step F529, and the process proceeds to the next row via step F530. If it is determined that Za(s, t) is not 0 (No), this can be regarded that the row is within the activation region 5, and therefore the process proceeds to the next row via step F530. In step F530, the to-be-selected row number i is incremented by 1, and, if the to-be-selected row number i is equal to or less than n (step F531), the process proceeds to step F522. In this way, the range of rows in which the reflected light 2 can be detected is defined as extending from i=Za(s, t) to i=Zb(s, t).

In the above arrangement, the Xa(s, t), Xb(s, t), Za(s, t), and Zb(s, t) are determined per light B(s, t); however, the common values of Za(s) and Zb(s) may be set for each row s or, similarly, the common values of Xa(t) and Xb(t) may be set for each column t. Provided that the scanner 123 and the light receiver 154 are parallel to each other to a sufficient extent, such a simplification is available, and this results in a reduction in time for settings.

As has been described, by selecting rows and columns that satisfy G(j)=0, Xa(s, t)≤j≤Xb(s, t), and Za(s, t)≤i≤Zb(s, t), it is possible to select an activation region 5 that overlaps the projection region 4A corresponding to light B(s, t). The parameters G(j), Xa(s, t), Xb(s, t), Za(s, t), and Zb(s, t) are stored in the memory 95. In other words, the distance sensor stores activation regions therein. When the scanner 123 emits light B(s, t), the distance sensor 153 reads the above parameters, selects corresponding rows and columns, and brings only SPADs within the activation region 5 into measurable mode. Such a synchronous control is carried out by the control section 160.

(One Example of Method of Determining Time-of-Flight by Distance Measurement Unit)

Figure 11:
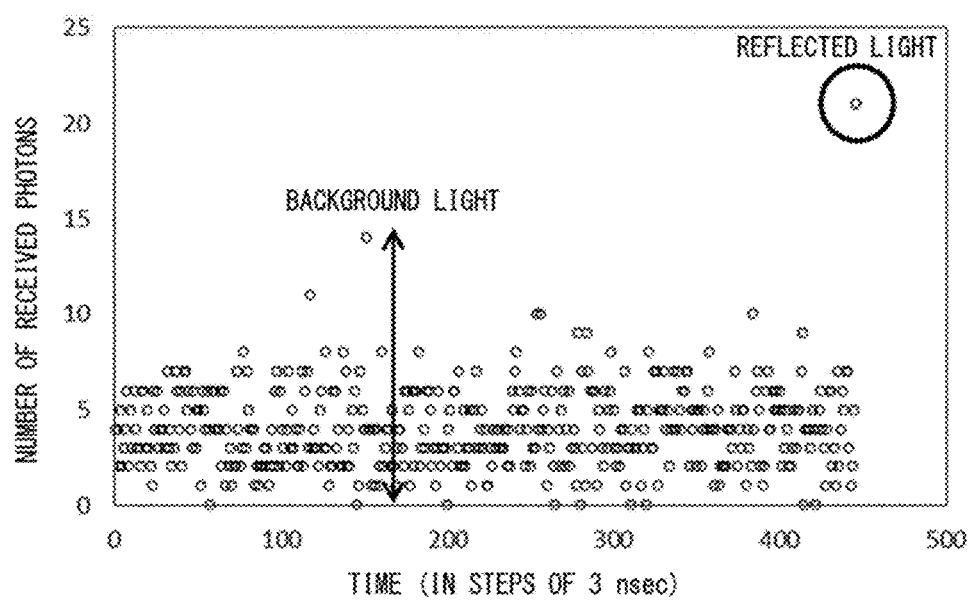
FIG. 11 shows the results of measurement in relation to the optical radar apparatus in accordance with Embodiment 1 of the present invention.

The following description will discuss one example of a method of determining time-of-flight (ToF) by the distance measurement unit 93. In regard to one emission of light B(s, t), the values N(l) (l=0, 1, . . . 1m) of reflected light 2 each measured at l×ΔT after each emission of light B(s, t) are recorded in the distance measurement unit 93, where ΔT is a certain period. Assume here that the period ΔT is set to half the pulse width of the light B(s, t). One example of the values N(l) is shown in FIG. 11. Most of the values N(l) indicate signals resulting from background light, and, a signal that exceeds a signal level Nb of background light is reflected light from the object 3 corresponding to the light 1. Note, however, that, as shown in FIG. 11, the values N(l) are distributed in accordance with Poisson distribution, and therefore involves great variations. Therefore, care should be taken when the signal level Nb of the background light is determined. The signal level Nb is determined in the following manner. First, the average <N> of the values N(l) is obtained. In Poisson distribution, dispersion is equal to the square of the average; therefore, the signal level Nb can be represented as <N>+α·√<N>, where α is a constant from about 3 to about 5. In the example shown in FIG. 11, <N>=4.0, and the maximum value 14 corresponds to α=5. On the other hand, for example, assuming that α=3, the signal level Nb is 11, and this cannot exclude two points equal to and above a signal count 12. However, even an object 3 with a signal intensity of only 12 (signal intensity of reflected light 2 corresponding to light 1 is weak) can be recognized as an object. As such, it is only necessary to employ different values α in (i) cases where a wide range of things that may possibly be an object is to be detected even if some noise is also detected and (ii) cases where only exact objects are to be detected by eliminating potential noise as much as possible. As described above, the distance measurement unit 93 has the function of determining the background light level Nb from a series of recorded values N(l), extracting a signal exceeding the level Nb as an object, and finding the time-of-flight of the signal. Although the above description discusses one light emission, the same applies to arrangements in which the values obtained by measurement of a plurality of light emissions are summed and the result is used as the value N(l).

Note that a method of measuring time-of-flight is not limited to the above method. There are other methods for finding time-of-flight from pulse output from the activation region 5, and such methods can be employed. For example, the following method can be employed: a pulse output from the activation region 5 is subjected to AD conversion; and ToF is obtained from changes in time of the converted pulse output. Alternatively, the following method can be employed: pulse output is subjected to time-to-digital conversion to form a histogram; and ToF is found from the shape of the histogram.

(Control Section 160 and Light Receiving System Power Source 141)

These members can be achieved by employing known techniques, and therefore descriptions therefor are omitted here.

Explanations of Examples and Effects

Effects were studied with the following configuration: emission wavelength of the light emitting device 121 is 905 nm, peak power is 31 W, and pulse width is 6 nsec. The dimensions of the emission region of the edge emitting laser chip were P=200 µm and U=10 µm. The divergence angle of light in near field in the X direction was 10 degrees and that in the Z direction was 25 degrees. The focal length of the collimator lens 122 is 20 mm (fc). The divergence angle of light coming out of the collimator lens 122 in the Z direction was ±0.014 degrees and that in the X direction was ±0.286 degrees. In view of above, parameters were set as follows: θh=24 degrees, θv=12 degrees, Δθz=Δθx=0.6 degrees, Sm=40, and Tm=20.

The light receiver 154 of the distance sensor 153 includes, within a region measuring 10.82 mm×5.4 mm, 1.19 million 7 µm square SPADs that are arranged in 772 rows×1547 columns. In equations 6 and 7, Ix=10.2 mm, Iz=5.0 mm, Lmin=2 m, fd=24 mm, D=20 mm, Rx=50 µm, and Rz=50 µm.

The light detection portion of the photodiode of each SPAD is in the shape of a circle 4.5 µm in diameter, and its quantum efficiency was 15%. The optical band-pass filter 152 used here is an interference filter in which the central wavelength of its passable wavelength band is 905 nm and its passable bandwidth is 45 nm.

After the optical radar apparatus 100 was assembled, steps F1 to F4 in FIG. 7 were carried out. The number of SPADs whose dark count number was large was 19 (average) in the light receiver 154, and columns containing these SPADs were determined not to be used. The percentage of these columns with respect to the total number of columns is 1.2%, and this does not impair the functions of the light receiver 154.

Example 1

Next, light B(s, t) within the range of s=0 to 40 and t=0 to 20 was applied to an object (white wall) at a distance of 20 m from the optical radar apparatus 100, and the step of selecting columns and rows shown in FIG. 9 was carried out with respect to each combination of s and t. Note that the position of the object is preferably as far as possible from the optical radar apparatus 100. If possible, the object is located at or close to the maximum measurable distance. With this, it is possible to specify an activation region 5 that is effective for measuring objects located at or close to the maximum measurable distance. These steps are carried out in dark condition.

Figure 10:
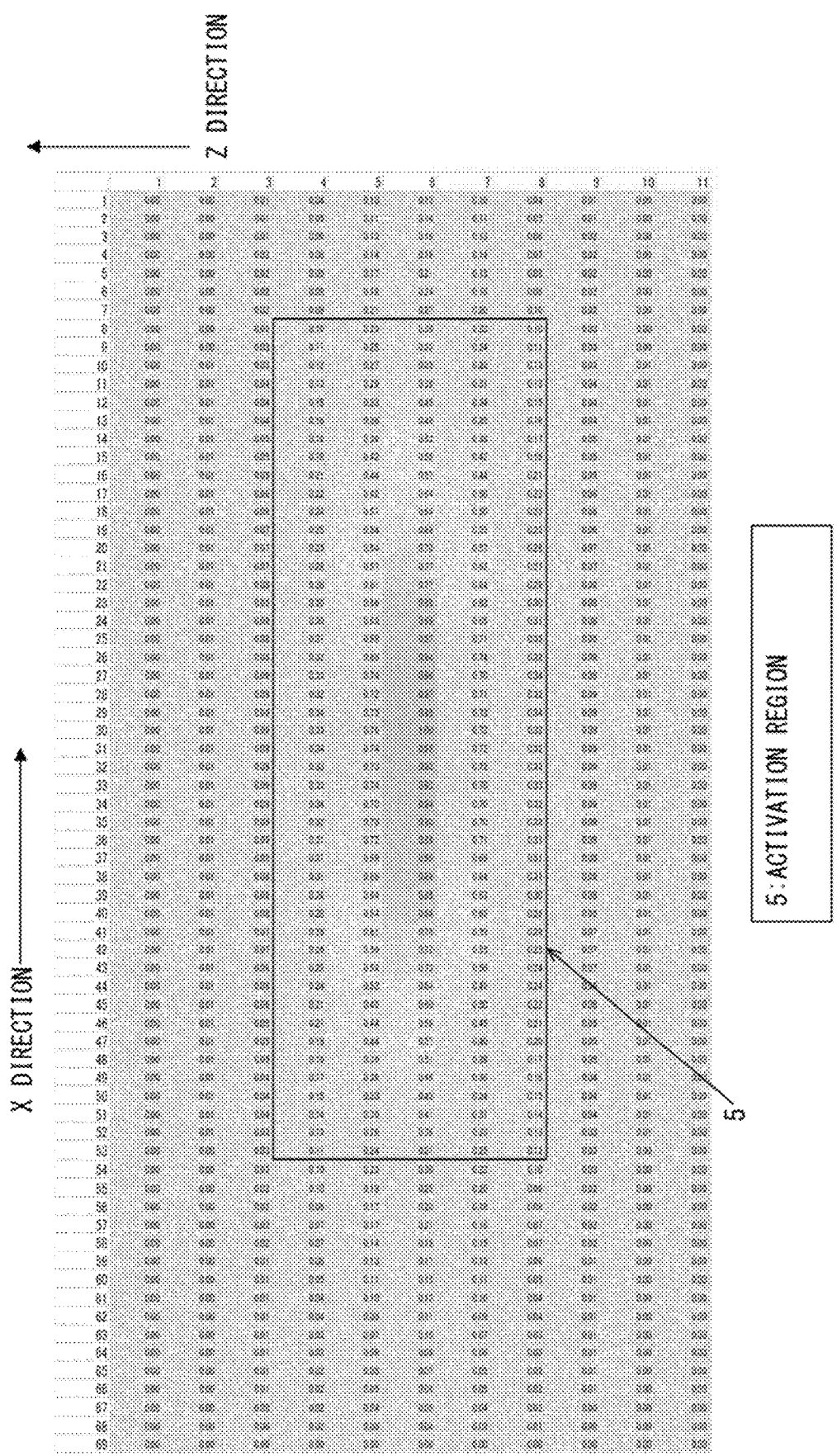
FIG. 10 shows an activation region in accordance with Embodiment 1 of the present invention.

As a result, on average, Zb−Za was 5 and Xb−Xa was 46. That is, the average number of SPADs effective as an activation region 5 was 5×46=230. An example of the average measured data is shown in FIG. 10. FIG. 10 shows a distribution of the average amounts of received light normalized to the peak value. The activation region is much smaller than a region where the reflected light signal is detected. For the determination of the activation region 5, not only the intensity distribution at 20 m but also the following two aspects were taken into consideration. (1) At a point 20 m distant from the apparatus, the center of the projection region 4A shifts leftward by about 24 µm (20× 24/20E3) as compared to when the object is at infinity, and therefore the activation region 5 was expanded by 3 cells (equivalent to 21 µm) rightward. (2) At the minimum measurable distance (2 m), the center of the projection region 4A shifts leftward by 216 µm (20×24/2E3-20×24/ 20E3); however, the dimension of the activation region 5 in the X axis direction does not expand to the extent that corresponds to this shifting. The projection region 4A expands by 44 µm (3.7×24/2E3) and, in addition, the dimension of the activation region 5 in the X axis direction is 322 µm (46×7 µm); therefore, even at the minimum measurable distance, a certain size of light receiving region can be achieved in the activation region 5. At short distances, since the intensity of reflected light is strong, the activation region 5 does not need to cover the entire projection region 4A. Rather, the expansion of the activation region 5 results in an increase in number of SPAD (i, j) that only receive background light when a distant object is measured, resulting in a decrease in S/N ratio. This makes it impossible to increase maximum measurable distance.

Example 2

The results obtained by measuring time-of-flight in regard to an object placed at a distance of 200 m from the optical radar apparatus 100 were shown in FIG. 11. The measurement was carried out on a sunny day in July, and therefore background light is very intense. The photon count number resulting from background light was 14 at the maximum and 4.0 on average. Also at a distance of 200 m, a signal sufficiently greater than the maximum background light signal was obtained. When the measurement was carried out repeatedly, the photon count number resulting from a signal from the object was 26.7 on average, 36 at maximum, and 16 at minimum. As such, the maximum measurable distance in this arrangement can be set to about 200 m. Also at the minimum measurable distance (2 m), the object was detected unfailingly.

As has been described, the present arrangement is as follows. In an optical radar apparatus, a spot beam is two-dimensionally scanned by means of a non-mechanical scanning system, and reflected light is focused onto a light receiver of a distance sensor through a focusing optical element. Activation regions on the light receiver are specified for respective spot beams, and, in synchronization with beam scanning, a corresponding one of the activation regions of the light receiver is selected.

According to the above arrangement, always only a part of the light receiver reached by the reflected light 2 corresponding to the light 1 is activated, and thereby an optical radar apparatus that has high S/N ratio and long maximum measurable distance can be achieved. The above arrangement also makes it possible to eliminate the need for high accuracy in assembling the optical radar apparatus, and thus possible to improve production efficiency and reduce assembly cost.

Embodiment 2

Embodiment 2 is the same as Embodiment 1, except that a distance sensor of Embodiment 2 has a different configuration from the distance sensor 153 of Embodiment 1.

(Distance Sensor 153a)

Figure 12:
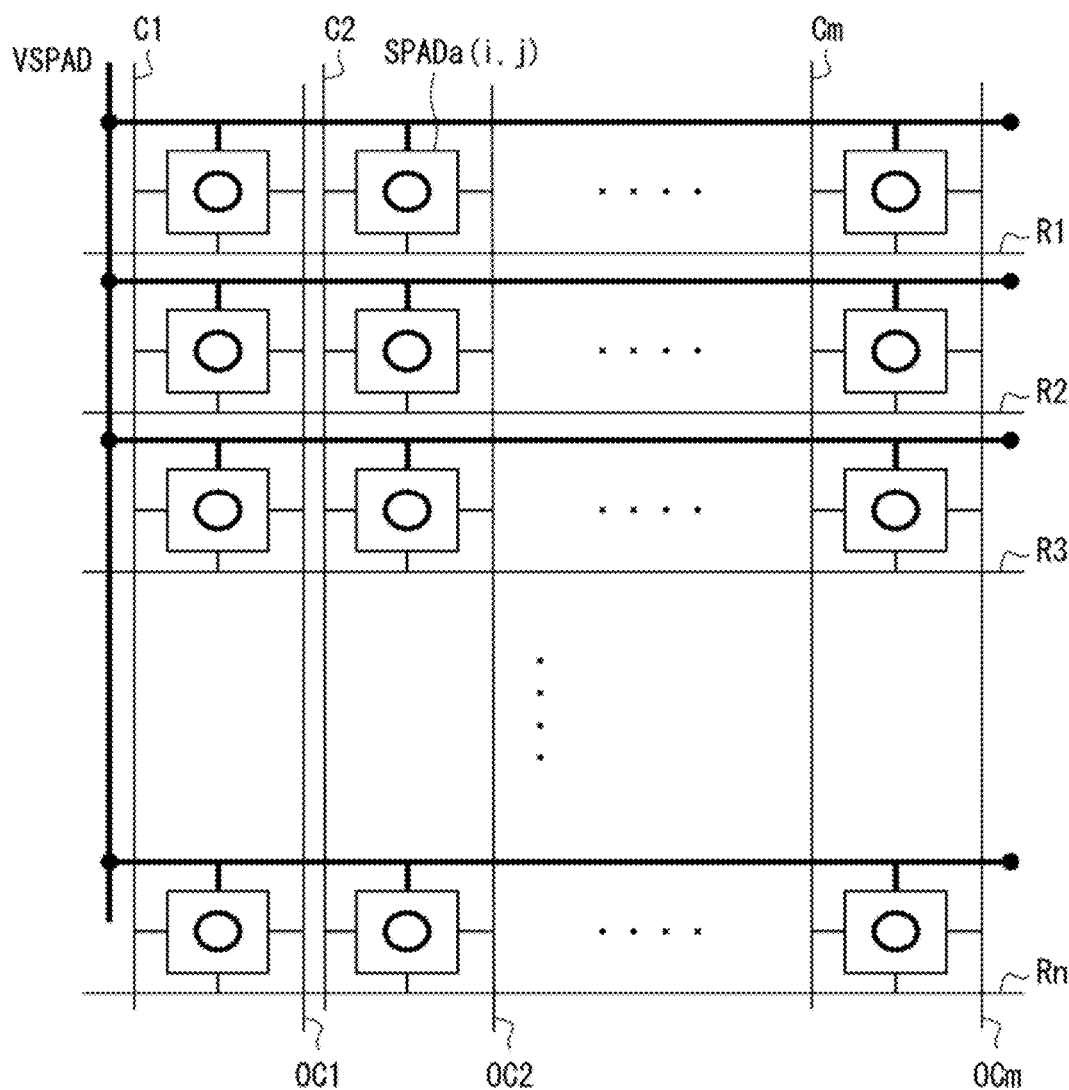
FIG. 12 schematically illustrates a configuration of an SPAD array constituting a light receiver in accordance with Embodiment 2 of the present invention.
Figure 13:
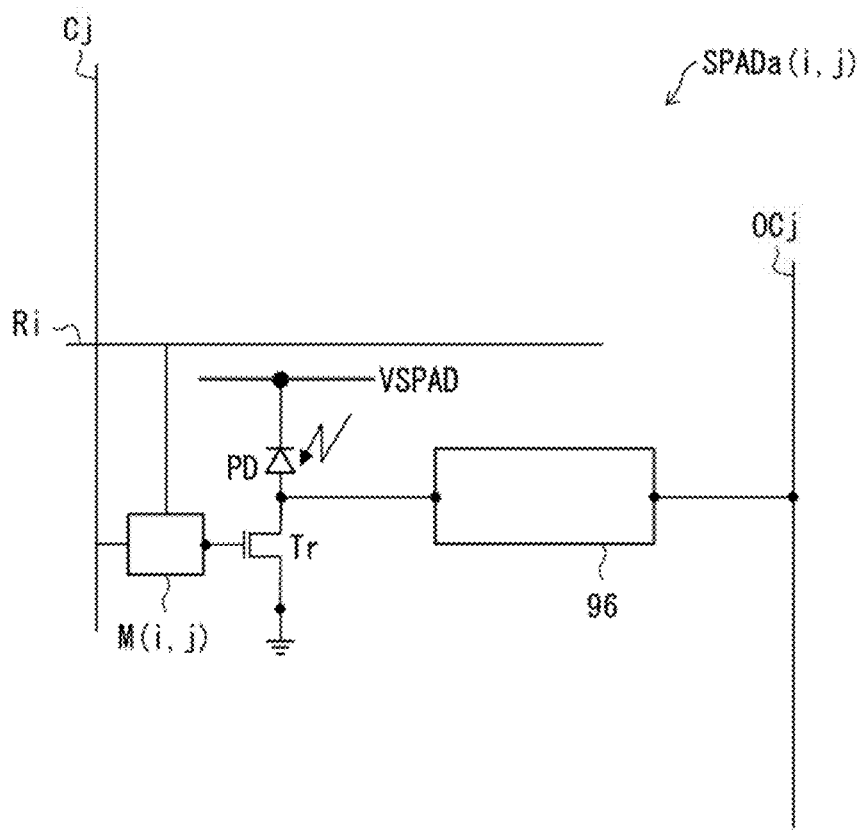
FIG. 13 schematically illustrates a configuration of an SPAD constituting the light receiver in accordance with Embodiment 2 of the present invention.

A distance sensor 153a of this arrangement is configured as illustrated in FIG. 4, similarly to the distance sensor 153. The distance sensor 153a is different from the distance sensor 153 in that the distance sensor 153a includes SPADa (i, j) and that the array configuration of the SPADa(i, j) is different. In particular, the distance sensor 153a is different from the distance sensor 153 in configuration of a row selecting section 90a. The array configuration of Embodiment 2 is such that, as illustrated in FIG. 12, SPADa(i, j) are connected to power source lines VSPAD, row selection lines Ri, column selection lines Cj, and column signal lines OCj. The SPADa(i, j) are, as illustrated in FIG. 13, the same as those (SPAD(i, j) in FIG. 5) of Embodiment 1 in that the SPADa(i, j) each include a photodiode PD, a transistor Tr, and a pulse output circuit 96. A large difference resides in a method of controlling the gate electrode of the transistor Tr to bring the photodiode PD into detectable mode.

In Embodiment 1, direct control is carried out by the column selection lines Cj. In contrast, in each of the SPADa (i, j) of this arrangement, the gate electrode of the transistor Tr is connected to a memory circuit M(i, j), and the SPADa(i, j) is controlled in accordance with the state of the memory circuit M(i, j). In Embodiment 1, the SPAD(i, j) are controlled on a row-by-row and column-by-column basis; however, according to this arrangement, the SPADs can be selected each independently by use of the memory circuits M(i, j). This enables more precise setting of the activation region 5a as compared to Embodiment 1. In Embodiment 1, the SPADs are supplied with power by the row selection lines Ri; however, in Embodiment 2, the SPADs are supplied with power by the power source lines VSPAD. The memory circuits M(i, j), each of which controls the transistor Tr serving as a switch to activate each SPAD, are controlled by the row selection lines Ri and the column selection lines Cj. The memory circuits M(i, j) need only be capable of at least storing ON or OFF state of the transistor Tr, and need only have a single-bit memory. The following description is based on the assumption that the transistor Tr is turned on when a corresponding memory circuit M(i, j) is in H state and the transistor Tr is turned off when the memory circuit M(i, j) is in L state. The memory of each memory circuit M(i, j) is a usual SRAM, and, before emission of light B(s, j), writing into the memory circuits M(i, j) corresponding to the activation region 5a is carried out. The writing into each memory device M(i, j) is carried out via a corresponding row selection line Ri and a corresponding column selection line Cj. For example, the following arrangement may be employed: at a point in time in which the ToF measurement with respect to a certain light has completed, all the circuits M(i, j) are reset to L state, and, before emission of light B(s, j), if a column selection line Cj is in H state when a corresponding row selection line Ri is activated, a corresponding circuit(s) M(i, j) turns into H state, and if not, the corresponding circuit(s) M(i, j) is maintained at L state. As such, the row selection circuit 90 and the column selection circuit 91 are not particularly limited, provided that they have a usual decoder circuit function. As has been described, although a method of selectively activating SPADa (i, j) is different, the distance sensor 153a is the same as the distance sensor 153 in that only SPADa(i, j) that overlap the projection region 4A are activated. It is possible to set, for each light B(s, t), an activation region 5a that corresponds to the projection region 4A.

The setting of the activation region 5a is carried out in accordance with the overall flow of FIG. 7; however, in Embodiment 2, the setting of the activation region 5a is carried out on a SPADa(i, j)-by-SPADa(i, j) basis. In other words, the activation region is set on a SPAD-by-SPAD basis. Therefore, the details of step F5 are different. The step of excluding faulty SPADs is carried out in accordance with a flow of FIG. 14, and the setting of the activation region 5a is carried out in accordance with a flow of FIG. 15.

(Evaluation of SPAD Characteristics in Dark Condition [Corresponding to Step F4])

Figure 14:
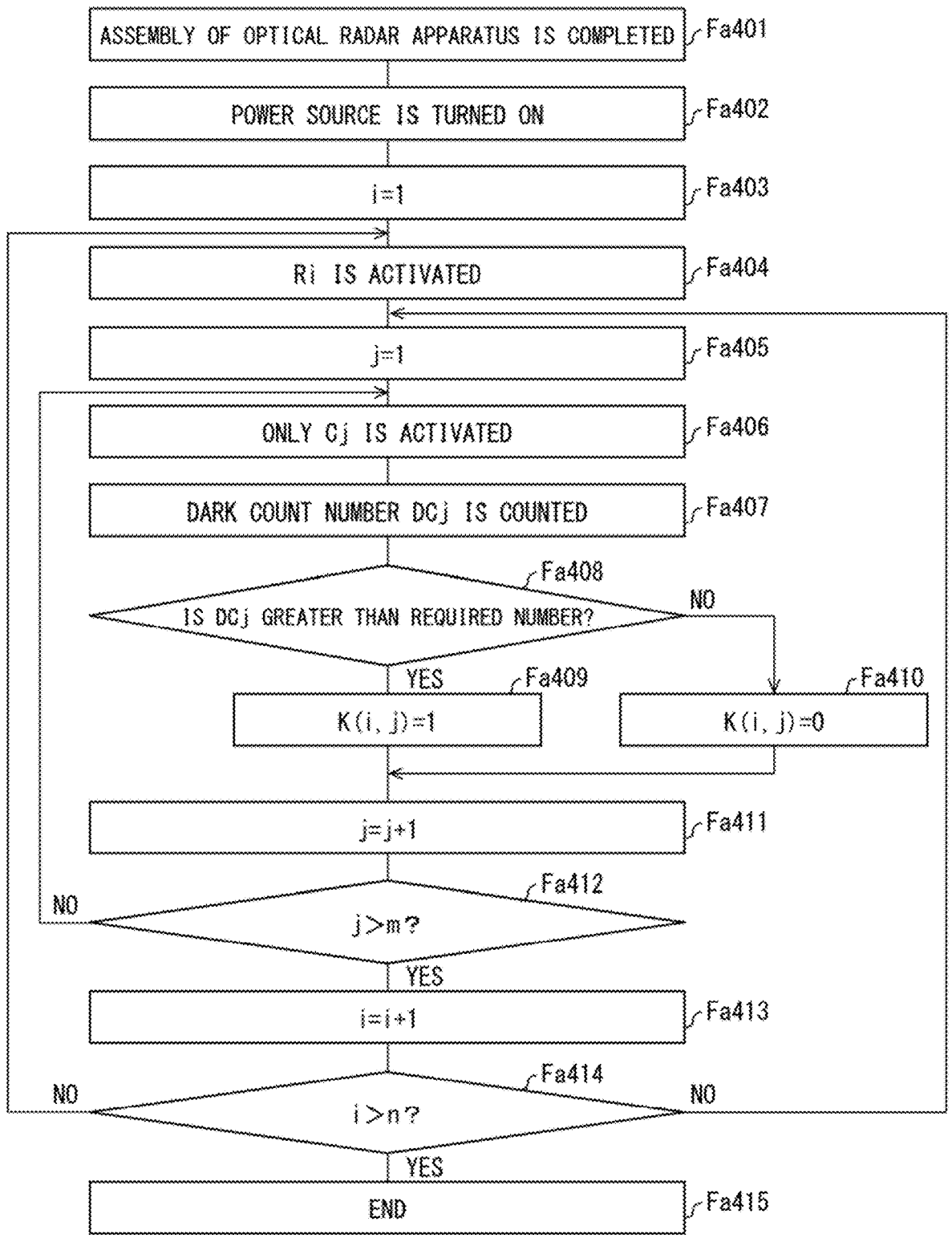
FIG. 14 schematically shows a step of excluding faulty SPADs in the light receiver in accordance with Embodiment 2 of the present invention.

FIG. 14 shows an evaluation of SPAD characteristics in dark condition corresponding to step F4. In this evaluation, care should be taken so that light does not enter the light receiver 154.

First, the optical radar apparatus 100a is assembled by a user (step Fa401), and a power source is turned on (step Fa402). Memories K(i, j) are each a single-bit memory. If K(i, j)=0, SPADa(i, j) can be used, whereas, if K(i, j)=1, SPAD a (i, j) cannot be used. The memories K(i, j) are stored in a memory 95.

Next, in the optical radar apparatus 100a, in the initial state, "i" that indicates a to-be-selected row is set to 1 (step Fa403).

Next, a row selection line Ri is activated by the row selection circuit 90 (step Fa404).

Steps Fa405 to Fa412 form a loop that sequentially tests the first to m-th columns.

First, in step Fa405, the first column is selected by the column selection circuit 91.

Next, in steps Fa406 to Fa414, a column selection line Cj is activated by the column selection circuit 91 (step Fa406). With this, a SPADa(i, j) is activated, and pulse outputs in dark condition are summed by a column counter CTj (step Fa407). Whether the sum DCj is greater or less than the required value is determined (step Fa408). If it is determined that the sum DCj is greater than the required value, this means that SPADa (i, j) cannot be used, and therefore K(i, j) is set to 1 (step Fa409). If it is determined that the sum DCj is less than the required value, this means that there is no problem; therefore K(i, j) is set to 0 (step Fa410). The to-be-selected column number j is incremented by 1 (step Fa411), and the process proceeds to step Fa406. After all the columns in the i-th row have been tested by the loop of steps Fa404 to Fa412, the to-be-selected row number i is incremented by 1 (step Fa413), and the process proceeds to step Fa404 for the next row. If the to-be-selected row number i has exceeded n, the test ends (the process proceeds to END in step Fa414).

According to this arrangement, only SPADa(i, j) whose dark count number is large can be selected. This makes it possible to reduce the influence of faulty SPADs as compared to Embodiment 1 in which the entire column is determined not to be used. Such a continuous flow is controlled by the control circuit 94.

(Setting of Activation Region)

Flow F5 for setting the activation region 5a is described with reference to FIG. 15. The position of an object and conditions under which the measurement is carried out are the same as those of Embodiment 1. For setting an activation region 5a that corresponds to light B(s, t), a parameter Q(i, j, s, t) is used. For example, if Q(i, j, s, t)=1, this means that an SPADa(i, j) is included in an activation region 5a that corresponds to light B(s, t), whereas, if Q(i, j, s, t)=0, this means that the SPADa(i, j) is not included in the activation region 5a.

First, the power source of the optical radar apparatus 100a is turned on by a user (step F701), and then the following steps are carried out with respect to each combination of s and t. Note that it is preferable that this step is carried out in dark condition so that light other than the light emitted by the optical radar apparatus 100a will not be incident on the light receiver 154.

Next, in steps F704 to F706, in the initial state, "i" indicative of a to-be-selected row is set to 1 (step F704), j is set to 1 (step F705), and the parameter Q(i, j, s, t) is set to 1 (step F706), and a check of amount of received light is carried out with respect to each j.

Next, on the basis of K(i, j) obtained as a result of step F4, SPADa(i, j) in j-th columns that satisfy K(i, j)=1 are not subjected to the check of amount of received light because a dark count fault is contained, and the process proceeds to step F713 and the parameter Q(i, j, s, t) is set to 0. If K(i, j)=0, a corresponding row selection line Ri and column selection line Cj are activated by the row selection circuit 90 and the column selection circuit 91 (step F708). In this state, light B(s, t) is applied to the object (step F709), and reflected light 2 is received (step F710). A column counter CTj corresponding to the activated j-th column records the number of detected photons resulting from the reflected light 2.

Next, in step F711, the number of counts Lj is read from the counter CTj, and, in step F712, if the number Lj is less than the required number, this does not belong to the activation region 5a, and therefore the parameter Q(i, j, s, t) is set to 0 (step F713). This makes it possible to exclude SPADa(i, j) that are not reached by the reflected light 2.

Next, in step F714, j is incremented by 1 (step F714), and, if the to-be-selected column number j is less than m (step F715), the process proceeds to step F706. In this way, columns in which the dark count number is not more than the predetermined value and in which the reflected light 2 can be detected are selected, and the result is recorded in Q(i, j, s, t).

Next, upon completion of check of all the j columns, the row number is incremented by 1 (step F716) and, as long as i<n, the process proceeds to step F705. In this manner, the amount of received light is measured at each SPADa(i, j), and only SPADa(i, j) in which the amount of received light is equal to or greater than the designed value are selected. The parameters Q(i, j, s, t) are stored in the memory 95 and, before emission of light B(s, t), written into the memory circuits M(i, j).

In the above manner, only SPADa(i, j) whose amount of received light is about 30% or more of the maximum amount of received light were specified as an activation region 5a. The average number of SPADs included in the activation region 5a was 187. By selecting only an area that receives a large amount of light, the activation region 5a is limited to a small area. That is, only SPADs with a large amount of signal are selected. This makes it possible to effectively detect reflect light that corresponds to light while preventing or reducing an increase in background light signal. As such, the maximum measurable distance equivalent to that of Embodiment 1 was achieved.

If the number of memories for storing patterns of activation region 5a for all lights B(s, t) is preferably smaller, the following arrangement may be employed: only an activation region pattern for cases where the light 1 resides at the center of the target field of view 10 is stored in the memory; and, in regard to other scanning directions, the center of the activation region pattern is moved in accordance with the following equations.

$$x = -fd \cdot \tan \theta x$$

$$z = -fd \cdot \tan \theta z$$

Explanation of Examples and Effects

Effects were studied with a configuration similar to that of Embodiment 1. The following description discusses only points of difference from Embodiment 1. First, a rod lens was placed right in front of the light emitting device 121, and the divergence angle was kept at 10 degrees so that the shape of a cross section of light 1b nearest the optical radar apparatus 100a was a circle or substantially a circle. As a result, the broadening of the projection region 4A in the X axis direction decreased.

After the optical radar apparatus 100a was assembled, steps F1 to F4 in FIG. 7 were carried out. As a result of the step of excluding faulty SPADs shown in FIG. 14, the number of SPADs whose dark count number was large was 20 (average) in the light receiver 154, and these SPADs were determined not to be used. The percentage of faulty SPADs with respect to the total number of SPADs was 0.0017% (=20/(772×1547)), and this does not impair the functions of the light receiver 154.

Example 3

Figure 15:
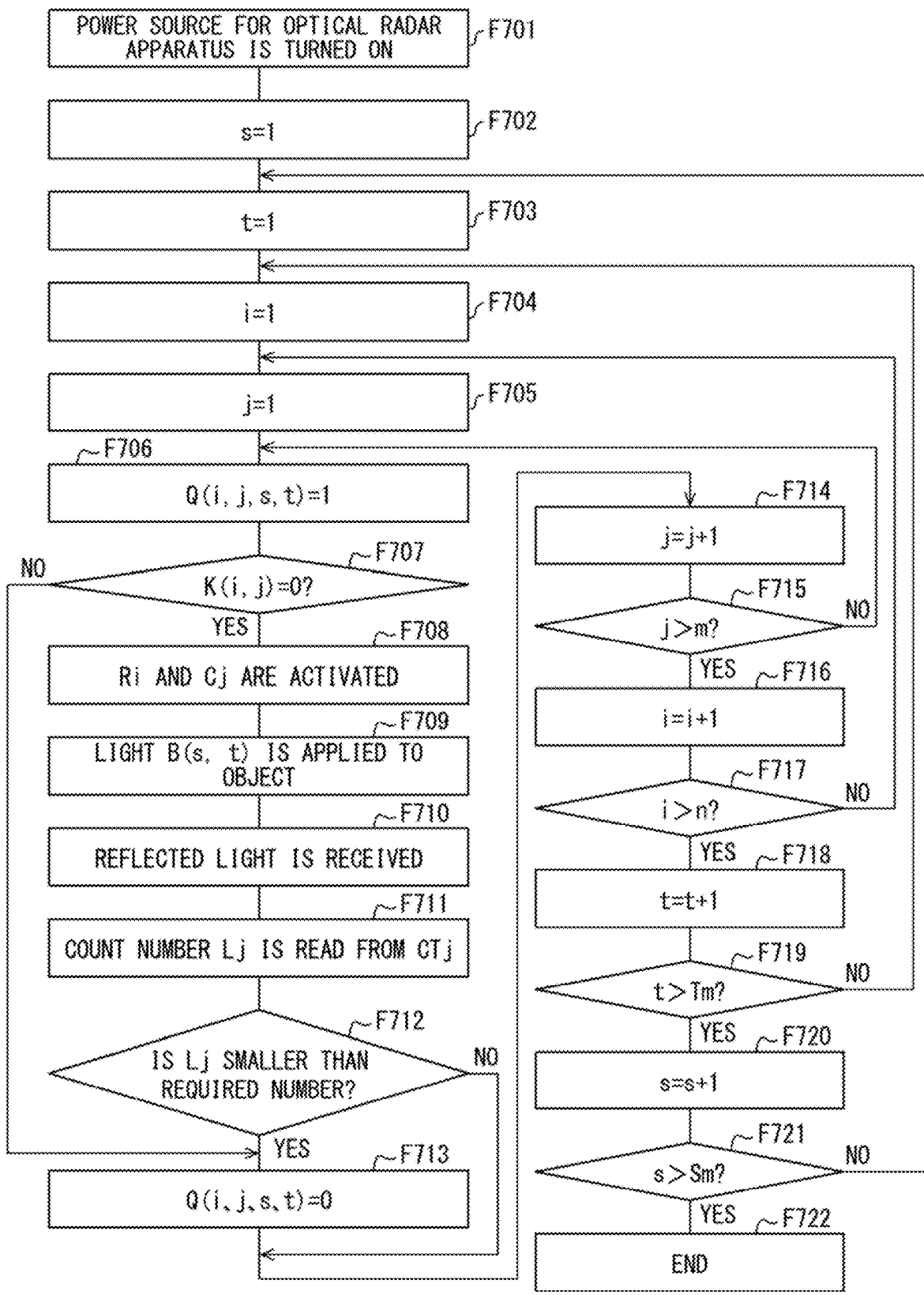
FIG. 15 schematically illustrates a step of selecting to-be-activated SPADs in the light receiver in accordance with Embodiment 2 of the present invention.
Figure 16:
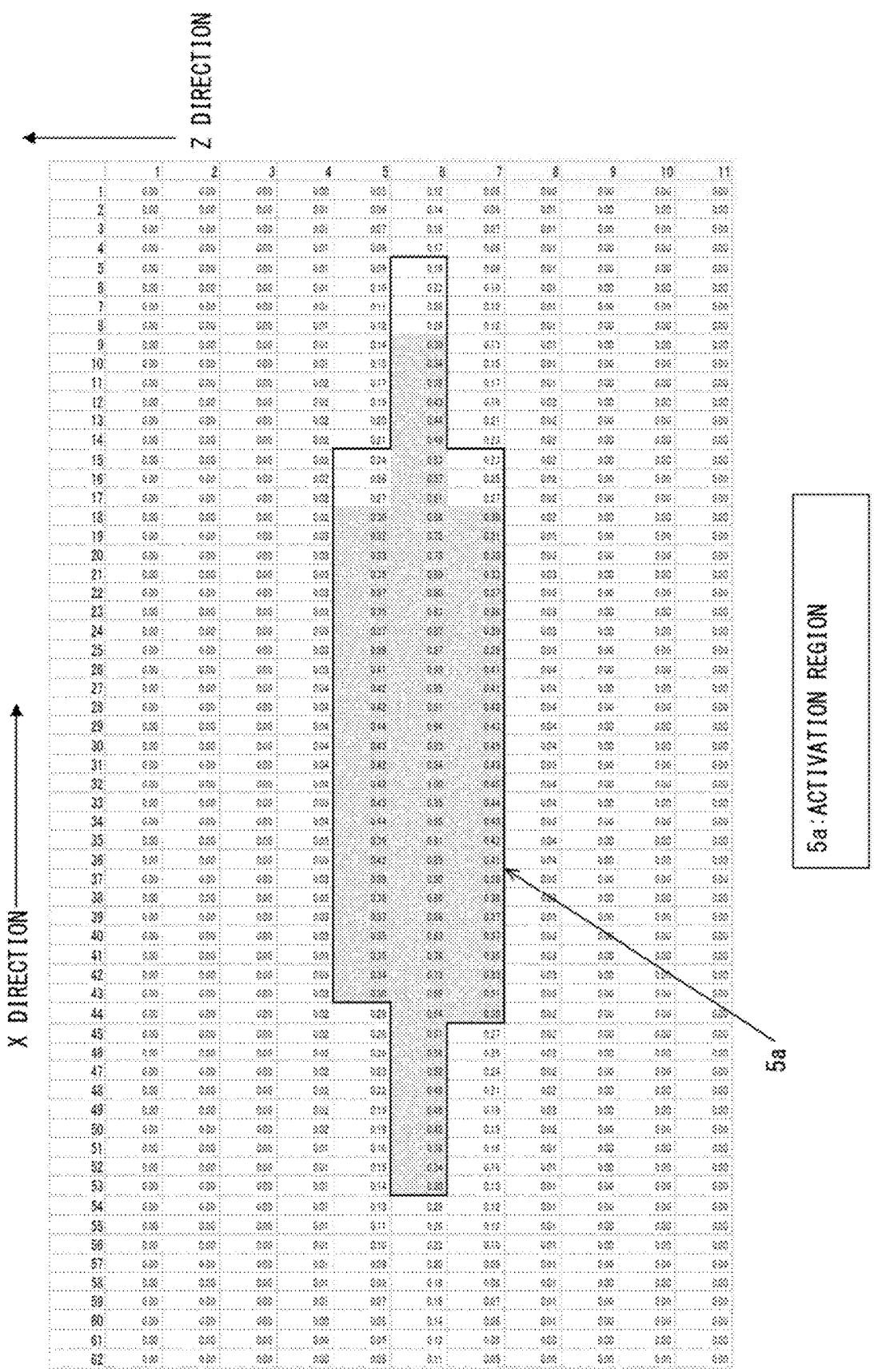
FIG. 16 illustrates an activation region in accordance with Embodiment 2 of the present invention.

Next, light B(s, t) within the range of s=0 to 40 and t=0 to 20 was applied to an object (white wall) at a distance of 20 m from the optical radar apparatus 100a, and the step of selecting columns and rows shown in FIG. 15 was carried out with respect to each combination of s and t. An example of the average results of light reception is shown in FIG. 16. The SPADs (i, j) with an intensity of 30% or more of the peak intensity are hatched. In contrast, the activation region 5a is enclosed by solid line. The reasons why the area expanded rightward but not leftward are the same as Embodiment 1. The average number of SPADs included in one activation region 5 was 108.

This arrangement achieved similar effects to those of Embodiment 1.

Embodiment 3

Embodiment 3 is the same as Embodiment 1, except that a distance sensor 153b of Embodiment 3 has a different configuration from that of Embodiment 1.

(Distance Sensor 153b)

Figure 18:
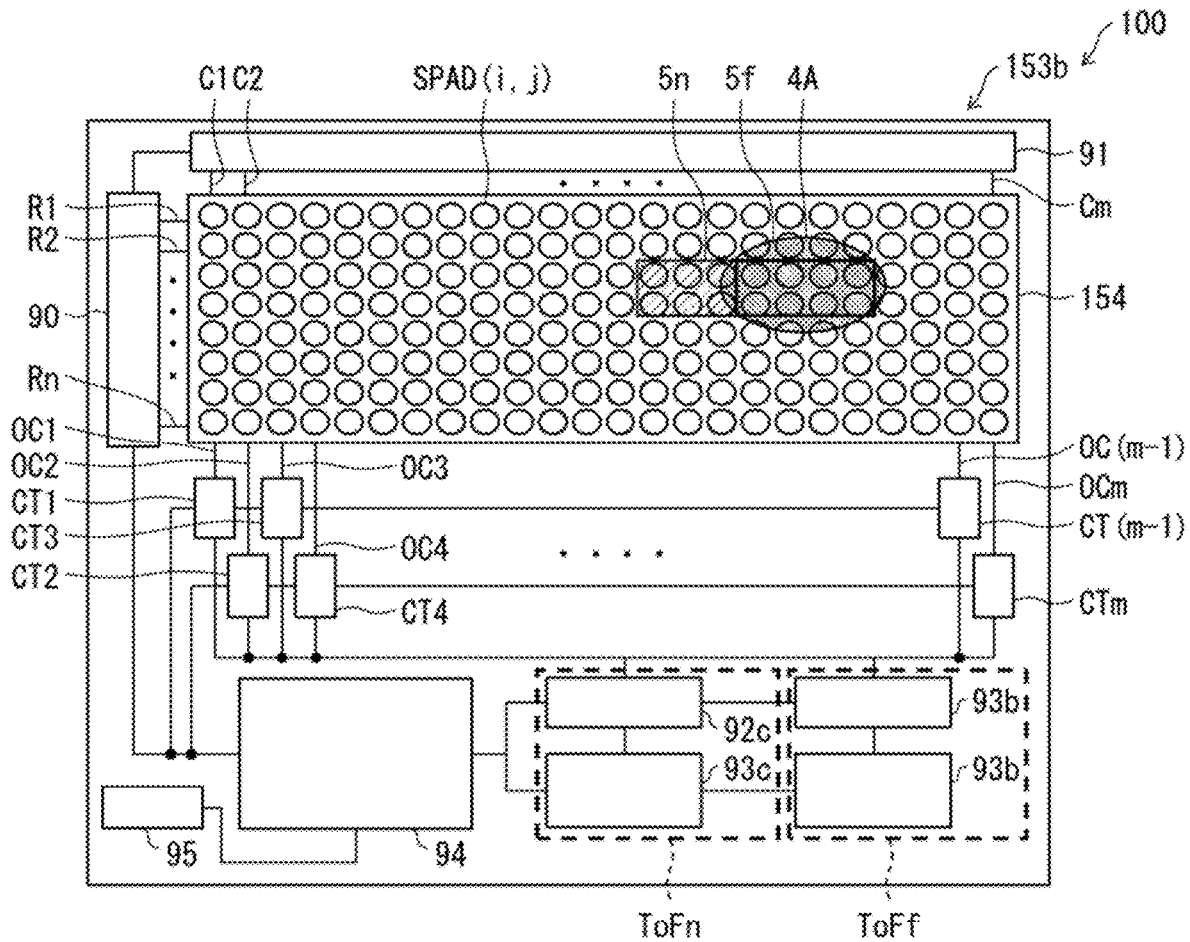
FIG. 18 schematically illustrates a configuration of a distance sensor in accordance with Embodiment 3 of the present invention.

The distance sensor 153b of this arrangement is configured as illustrated in FIG. 18. As illustrated in FIG. 18, according to Embodiment 3, an activation region of a light receiver is divided into two. That is, an activation region 5f suitable for long-distance measurement and an activation region 5n suitable for short-distance measurement, which do not overlap each other, are set so as to correspond to respective lights B(s, t). In other words, the activation region 5f suitable for long-distance measurement and the activation region 5n suitable for short-distance measurement are set in accordance with scanning directions. Two kinds of parameter Q(i, j, s, t) defining the respective activation regions are set. For example, the parameter Q(i, j, s, t, u), where u is f or n, is used to distinguish between the activation regions 5f and 5n. The activation regions 5f and 5n for respective lights B(s, t) do not overlap each other. That is, Q(i, j, s, t, f)=Q(i, j, s, t, n)=1 never holds.

Since the two activation regions are provided, it is also preferable that two distance measuring systems are provided. In other words, the distance sensor 153b includes a plurality of distance measuring systems (a system ToFf constituted by a summing circuit 92b and a distance measurement unit 93b, and another system ToFn constituted by a summing circuit 92c and a distance measurement unit 93c) that correspond to the respective activation regions 5f and 5n. That is, as illustrated in FIG. 18, the summing circuit 92b and the distance measurement unit 93b serve to find time-of-flight based on a signal from the activation region 5f, whereas the summing circuit 92c and the distance measurement unit 93c serve to find time-of-flight based on a signal from the activation region 5n.

The distance measuring system ToFn (summing circuit 92c and distance measurement unit 93c), which deals with a signal from the activation region 5n, is for measurement of near objects 3; therefore, it is preferable that the distance measuring system ToFn measures the distance more precisely. As such, temporal resolution is preferably increased. That is, the period $\Delta T$ is preferably shorter. When the distance to the object 3 is short, the intensity of reflected light 2 is strong; therefore, shortening of the period $\Delta T$ does not dramatically weaken signal intensity.

The distance measuring system ToFf (summing circuit 92b and distance measurement unit 93b), which deals with a signal from the activation region 5f, is for measurement of far objects 3, and therefore the intensity of reflected light 2 is weak. Therefore, what is most important is to capture the object 3, and therefore, even with some reduction in distance resolution (i.e., temporal resolution), the detection sensitivity needs to be increased. That is, it is preferable to increase the period $\Delta T$ to thereby improve the S/N ratio. As such, by employing different temporal resolutions for ToFn and ToFf, it is possible to increase the distance resolution for short distances and also to increase the maximum measurable distance, because far objects are also easy to capture. The difference between ToFn and ToFf is not limited to that in temporal resolution, and may be some other difference, such as a difference in sensitivity. For example, by changing a gate voltage applied to the transistor Tr of each SPAD c (i, j) to thereby reduce the sensitivity of ToFn as compared to ToFf, it is possible to prevent or reduce signal overflow that would result from an increase in intensity of the reflected light 2.

(Explanation of Effects)

By causing two activation regions and two distance measuring systems to operate in correspondence with each other, it is possible to achieve a high accuracy distance measurement both in cases where the object is at a distant point and the object is at a near point. In particular, by separately carrying out signal processing for long distance and signal processing for short distance, and by optimizing distance measurement algorithms for long distance and for short distance, it is possible to improve measurement performance.

(Relationship Between Activation Regions 5f and 5n)

Figure 17:
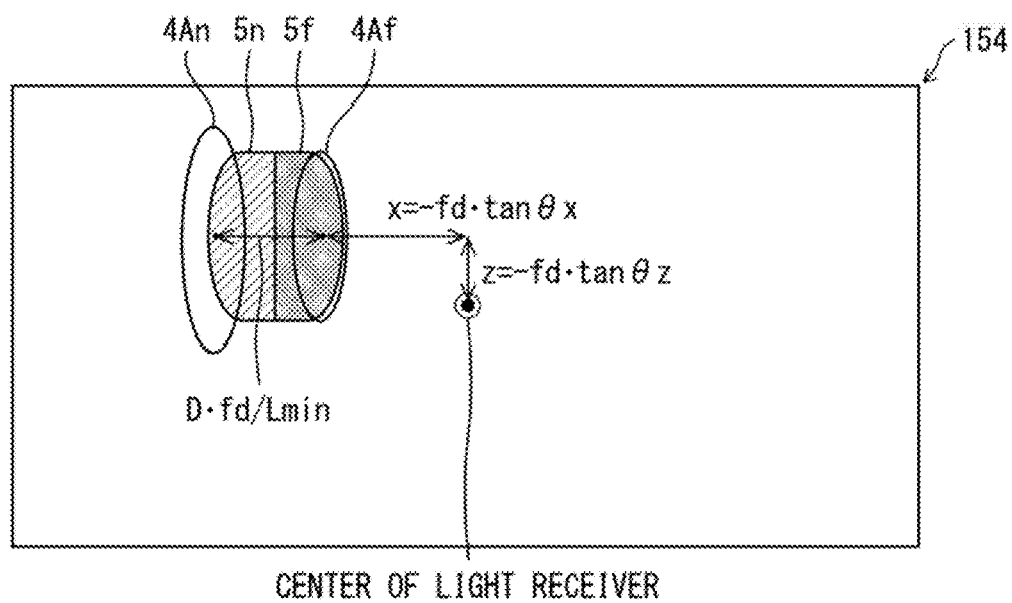
FIG. 17 schematically illustrates a light receiver of an optical radar apparatus in accordance with Embodiment 3 of the present invention.

FIGS. 17 and 18 show the relationship between the activation regions 5f and 5n on the light receiver 154. FIGS. 17 and 18 deal with an arrangement in which, for the purpose of increasing the resolution in the horizontal direction, an edge emitting laser device is disposed such that its active layer is in parallel to the Z axis, and an irradiated region 4 and a projection region 4A are each in the shape of an oval elongated in the Z axis direction. Thus, as illustrated in FIG. 17, the activation regions 5f and 5n are next to each other along the direction of their short sides. Furthermore, in this arrangement, the light 1 near the optical radar apparatus 100b is shaped into substantially a circle. As illustrated in FIG. 17, reflected light 2f from an object 3f at the maximum measurable distance Lmax is projected to form a projection region 4Af. The diameter and the coordinates of the center of the projection region 4Af are represented by the following equations, where I$\varphi$f (L, z) and I$\varphi$f (L, x) represent the dimension along the major axis (in the Z axis direction) and the dimension along the minor axis (in the X axis direction), respectively.

$$I\varphi f(Lmax,z) \approx P \cdot fd/fc \quad \text{(from equation 3)}$$

$$I\varphi f(Lmax,x) \approx U \cdot fd/fc \quad \text{(from equation 3)}$$

$$xf \approx -fd \cdot \tan \theta x \quad \text{(from equation 4)}$$

$$zf = -fd \cdot \tan \theta z \quad \text{(from equation 5)}$$

On the other hand, reflected light 2n from an object 3n at the minimum measurable distance Lmin is projected to form a projection region 4An, and the diameter and the coordinates of the center of the projection region 4An are represented by the following equations.

$$I\varphi n(Lmin,z) = P \cdot fd/fc + \varphi 0 \cdot fd/Lmin \quad \text{(from equation 3)}$$

$$I\varphi n(Lmin,x) = U \cdot fd/fc + \varphi 0 \cdot fd/Lmin \quad \text{(from equation 3)}$$

$$xn = -fd \cdot \tan \theta x - D \cdot fd/Lmin \quad \text{(from equation 4)}$$

$$zn = -fd \cdot \tan \theta z \quad \text{(from equation 5)}$$

That is, as compared to the projection region 4Af, the projection region 4An shifts by D·fd/Lmin in the negative X axis direction (in the direction going away from the light emitting section 110), and the diameter is larger by $\varphi 0 \cdot$fd/Lmin. Assuming that the object 3 moves from the maximum measurable distance Lmax to the minimum measurable distance Lmin, the center of the projection region 4A moves form the center of the projection region 4Af to the center of the projection region 4An. The distance moved is about D·fd/Lmin. The diameter of the projection region 4A increases by $\varphi 0 \cdot$fd/Lmin.

The activation regions 5f and 5n should not overlap each other. The activation region 5f should overlap the projection region 4Af, and the activation region 5n should overlap the projection region 4An. In view of this, assuming that the distance at the border between the activation regions 5f and 5n is Lb, settings are made such that: the activation region 5f covers a projection region 4A corresponding to a distance falling within the range of from Lmax to Lb; and the activation region 5n covers a projection region 4A corresponding to a distance falling within the range of from Lb to Lmin. The dimensions $\Delta$Xf and $\Delta$Xn in the X axis direction of the respective activation regions 5f and 5n are substantially represented by the following equations.

$$\Delta Xf = \alpha \cdot U \cdot fd/fc + D \cdot fd/Lb \quad \text{(equation 8)}$$

$$\Delta Xn = \alpha \cdot U \cdot fd/fc + D \cdot fd/Lmin - D \cdot fd/Lb \quad \text{(equation 9)}$$

In the above equations, a is a constant of about 1 to about 3. The size of each projection region 4A is a width at half height, and therefore the activation region is greater than the width at half height of the projection region 4A; therefore, the constant is for compensation of that difference. The actual widths of the activation regions $5f$ and $5n$ should each match an integer multiple of the size of an SPAD(i, j); therefore, the values of $\Delta Xf$ and $\Delta Xn$ are each adjusted to an integer multiple of the size of an SPAD(i, j). The value of a depends on the light intensity distribution in the projection region 4A, the size of each SPAD(i, j), and the like. The value of a here is 1.75. In regard to Lb, for example, the distance $Lb=Lmax/\sqrt{10}$ is set, at which the intensity of received light increases by about ten times as compared to the maximum measurable distance Lmax. Assuming that Lmax=100 m, Lmin=1 m, U=10 μm, fd=24 mm, fc=20 mm, and D=20 mm, the distance Lb is 31.6 m, the dimension $\Delta Xf$ is 35 μm, and the dimension $\Delta Xn$ is 483 μm.

Each of the dimensions $\Delta Zf$ and $\Delta Zn$ in the Z axis direction of the respective activation regions $5f$ and $5n$ needs only be long enough to cover at least $I\varphi f(Lmax, z)$. A further increase in $\Delta Zn$ will achieve an increase in amount of received light; however, since the amount of received light is large enough because the distance is relatively short, the $\Delta Zn$ does not necessarily have to be further increased.

(One Example of Method of Setting Activation Regions $5f$ and $5n$)

The following description will discuss one example of a method of setting the activation regions $5f$ and $5n$. First, an object is placed at the maximum measurable distance, light B(s, t) is applied, and an activation region $5p$ is determined in accordance with the method described in Embodiment 2. Next, the object is placed at the distance Lb, and an activation region $5q$ is determined in the same manner. Next, the object is placed at the distance Lmin, and an activation region $5r$ is determined in the same manner. Then, an activation region $5f$ is set such that the activation region $5f$ includes (i) the entire activation region $5p$ and (ii) a part of the activation region $5q$, which extends to the center of the activation region $5q$. The activation region $5n$ is set such that the activation region $5n$ includes a region that extends from the center of the activation region $5q$ to the center of the activation region $5r$.

This method takes time because the test needs to be carried out three times per light B(s, t). One way to shorten the time taken for the setting would be to, for example, only measure the activation region $5q$ and set the activation region $5f$ downstream of the center of the activation region $5q$ in the positive X axis direction and set the activation region $5n$ downstream of the center of the activation region $5q$ in the negative X axis direction. The dimensions in the X axis direction of the activation regions $5f$ and $5n$ may be determined based on the calculated values obtained using equations 8 and 9. The dimension in the Z axis direction may be equal to that of the activation region $5q$.

The control circuit 94 preferably has a step for determining an output of the distance sensor 153b based on the time-of-flights Tf and Tn measured by the activation regions $5f$ and $5n$, respectively. For example, the output may be as follows: if $2 \cdot Lmax/c \leq Tf \leq 2 \cdot Lb/c$, then Tf is outputted; if $2 \cdot Lmin/c \leq Tn \leq 2 \cdot Lb/c$, then Tn is outputted; if $Tf > 2 \cdot Lmax/c$ or $Tn < 2 \cdot Lmin/c$, measurement is unavailable. A problem arises when both $2 \cdot Lmax/c \leq Tf \leq 2 \cdot Lb/c$ and $2 \cdot Lmin/c \leq Tn \leq 2 \cdot Lb/c$ are satisfied. Such a case may occur when a transparent object exists at a short distance and another object exists at a long distance. One option to address this would be to output both the Tf and Tn or output only Tn with a focus on the nearer object. On the other hand, if the values of Tf and Tn are relatively close to each other, it is inferred that these values of Tf and Tn are attributed to the same object but are different because of measurement errors; therefore, another option would be to output Tn with a focus on the likelihood that the object is at a short distance.

In this way, by selecting, as the activation region $5f$ that is for long distances, a region suitable for the object $3f$ at the maximum measurable distance, it is possible to increase the maximum measurable distance. In cases where the minor axis of the projection region 4A is parallel to the X axis for the purpose of increasing the resolution in the X axis direction, since the distance moved by the projection region 4A upon a change in distance to the object 3 is much greater than the dimension along the minor axis, if a single activation region is employed to cover all the distances to be measured, the activation region will have a very large area. It follows that the activation region contains a large area that does not overlap the projection region 4Af for long distance, that the amount of received background light increases, that the S/N ratio decreases, and that the maximum measurable distance decreases. According to this arrangement, these issues are avoided, and the maximum measurable distance can be increased.

Although two activation regions are provided in this arrangement, this arrangement can be extended to an arrangement in which three or four activation regions are provided. This increases the number of circuits for use in finding a distance; however, the activation regions are optimized for their corresponding distance ranges, and therefore it is possible to improve the accuracy of measurement of a distance and increase the maximum measurable distance.

Note that, although Embodiment 3 describes the optical radar apparatus 100b using ToF measurement method for the distance sensor, it is not difficult to construct a multiple distance measurement system like Embodiment 3 using other distance measurement method like the frequency modulation distance measurement. Thus the distance sensor 153b having multiple activation region of the optical radar apparatus 100b may use other distance measurement method than ToF measurement.

[Recap]

An optical radar apparatus (100) in accordance with Aspect 1 of the present invention is an optical radar apparatus (100) including: a light emitting section (110) configured to emit light (1) so as to scan the light (1) with respect to a target field of view (10); and a light receiving system (140) configured to receive reflected light (2), the reflected light (2) being the light (1) that has been reflected by an object (3) in the target field of view (10), the light receiving system (140) at least including a focusing optical element (151) and a distance sensor (153) that includes a light receiver (154), the target field of view (10) being projected on the light receiver (154) through the focusing optical element (151), the distance sensor (153) being configured to set an activation region (5) in a part of the light receiver (140), the activation region (5) corresponding to the light (1) thus scanned, and measure a distance to the object (3) with use of a signal from the activation region (5).

According to the above arrangement, it is possible to provide a non-mechanical-scanning-type optical radar apparatus that achieves cost reduction without affecting the maximum measurable distance.

An optical radar apparatus (100) in accordance with Aspect 2 of the present invention may be arranged such that, in Aspect 1, the light emitting section (110) is configured to emit the light (1) so as to two-dimensionally scan the light (1) with respect to the target field of view (10).

According to the above arrangement, it is possible to unfailingly irradiate the entire target field of view (10).

An optical radar apparatus (100) in accordance with Aspect 3 of the present invention may be arranged such that, in Aspect 1 or 2, the light emitting section (110) includes a non-mechanical scanner (123).

According to the above arrangement, it is possible to irradiate the target field of view without having to use any mechanical feature. Therefore, such an arrangement is advantageous in size reduction and cost reduction of the optical radar apparatus.

An optical radar apparatus (100) in accordance with Aspect 4 of the present invention may be arranged such that, in any one of Aspects 1 to 3, the distance sensor (153) is configured to set the activation region (5) in correspondence with a scanning direction.

According to the above arrangement, it is possible to suitably set a desired activation region(s).

An optical radar apparatus (100) in accordance with Aspect 5 of the present invention may be arranged such that, in any one of Aspects 1 to 4, the distance sensor (153) is configured to set a plurality of the activation regions (5) in correspondence with respective scanning directions such that the plurality of activation regions (5) do not overlap each other.

According to the above arrangement, a plurality of activation regions are present; therefore, both in a case where the object is at a distant point and a case where the object is at a near point, it is possible to carry out highly accurate distance measurements.

An optical radar apparatus (100) in accordance with Aspect 6 of the present invention may be arranged such that, in Aspect 5, the distance sensor (153) includes a plurality of distance measuring systems that correspond to the respective plurality of activation regions (5).

According to the above arrangement, a plurality of distance measuring systems are present; therefore, both in a case where the object is at a distant point and a case where the object is at a near point, it is possible to carry out highly accurate time-of-flight measurements.

An optical radar apparatus (100) in accordance with Aspect 7 of the present invention may be arranged such that, in Aspect 5 or 6, the plurality of activation regions (5) set by the distance sensor (153) at least include two activation regions (5) that are for long distance and for short distance, respectively.

According to the above arrangement, by separately carrying out signal processing for long distance and signal processing for short distance, and by optimizing distance measurement algorithms for long distance and for short distance, it is possible to improve measurement performance.

An optical radar apparatus (100) in accordance with Aspect 8 of the present invention may be arranged such that, in any one of Aspects 1 to 7, the distance sensor (153) has the activation region (5) stored therein.

According to the above arrangement, it is possible to measure only light detection elements that reside within a desired activation region.

An optical radar apparatus (100) in accordance with Aspect 9 of the present invention may be arranged such that, in any one of Aspects 1 to 8, the activation region (5) does not contain a faulty part.

According to the above arrangement, a light detection element(s) that cannot be used for detection are excluded. This makes it possible to avoid fluctuations in amount of received light and thus possible to improve detection accuracy.

An optical radar apparatus (100) in accordance with Aspect 10 of the present invention may be arranged such that, in any one of Aspects 1 to 9, the light receiver (154) is comprised of light detection elements that are arranged in an array.

According to the above arrangement, the light receiver is capable of always covering the projection region with the smallest necessary number of light detection elements.

An optical radar apparatus (100) in accordance with Aspect 11 of the present invention may be arranged such that, in Aspect 10, the activation region (5) is set on a row-by-row and column-by-column basis in the array.

According to the above arrangement, it is possible to select light detection elements with good accuracy.

An optical radar apparatus (100) in accordance with Aspect 12 of the present invention may be arranged such that, in Aspect 10, the activation region (5) is set on a light detection elements-by-light detection element basis.

According to the above arrangement, it is possible to select light detection elements with better accuracy.

An optical radar apparatus (100) in accordance with Aspect 13 of the present invention may be arranged such that, in any one of Aspects 10 to 12, the distance sensor (153) includes a binary counter that is configured to sum pulse outputs from the SPADs.

According to the above arrangement, it is possible to suitably sum the pulse outputs from the SPADs through use of the binary counter.

The embodiments and examples here are described for illustrative purposes and are not intended to limit the scope of the present invention in any way. The scope of the present invention is defined not by the foregoing descriptions but by the claims, and is intended to encompass equivalents of the claims and all variations that fall within the scope of the claims.

REFERENCE SIGNS LIST 1, 1a, 1b, 1c light.
2, 2a, 2b, 2c, 2d reflected light
3, 3a, 3b, 3c, 3d object
4, 4a, 4b, 4c, 4d irradiated region
4A, 4Aa, 4Ab, 4Ac, 4Ad, 4An, 4Af projection region
5, 5a, 5n, 5f activation region
10 target field of view
90 row selecting section
91 column selecting section
92, 92b, 92c summing circuit
93, 93b, 93c distance measurement unit
94 control circuit
95 memory
100, 100a, 100b optical radar apparatus
110 light emitting section
120 driver circuit
121 light emitting device
122 collimator lens
123 scanner
141 light receiving system power source
151 focusing optical element
152 optical band-pass filter
153, 153a, 153b distance sensor
154 light receiver
160 control circuit
400 external system

The invention claimed is:

1. An optical radar apparatus comprising:
a light emitting section configured to emit light;
a scanner configured to scan the emitted light with respect to a target field of view; and
a light receiving system configured to receive reflected light, the reflected light being the light that has been reflected by an object in the target field of view,
the light receiving system at least including
a focusing optical element and
a distance sensor that includes a light receiver,
the target field of view being projected on the light receiver through the focusing optical element,
the distance sensor being configured to
set an activation region in a part of the light receiver, the activation region corresponding to the light reflected by the object, and
measure a distance to the object with use of a signal from the activation region, wherein
a dimension of the light receiver in a direction along which the light emitting section and the light receiving system are aligned with each other is greater than a size of the target field of view projected on the light receiver by at least a sum of (i) a size of a projection region corresponding to an irradiated region on the object at a minimum measurable distance of the optical radar apparatus and (ii) D·fd/Lmin, where D represents a distance between the light emitting section and the light receiving system, fd represents a focal length of the focusing optical element, and Lmin represents the minimum measurable distance.

2. The optical radar apparatus according to claim 1, wherein the scanner is configured to two-dimensionally scan the light with respect to the target field of view.

3. The optical radar apparatus according to claim 1, wherein
the light emitting section includes a non-mechanical scanner.

4. The optical radar apparatus according to claim 1, wherein
the distance sensor is configured to set the activation region in correspondence with a scanning direction.

5. The optical radar apparatus according to claim 1, wherein
the distance sensor is configured to set a plurality of activation regions in correspondence with respective scanning directions such that the plurality of activation regions do not overlap each other.

6. The optical radar apparatus according to claim 5, wherein
the distance sensor includes a plurality of distance measuring systems that correspond to the plurality of activation regions.

7. The optical radar apparatus according to claim 5, wherein
the plurality of activation regions set by the distance sensor at least include two activation regions that are for long distance and for short distance, respectively.

8. The optical radar apparatus according to claim 5, wherein
the plurality of activation regions are next to each other along a direction of short sides thereof.

9. The optical radar apparatus according to claim 1, wherein
the distance sensor has the activation region stored therein.

10. The optical radar apparatus according to claim 1, wherein
the activation region does not contain a faulty part.

11. The optical radar apparatus according to claim 1, wherein
the light receiver is comprised of light detection elements that are arranged in an array.

12. The optical radar apparatus according to claim 11, wherein
the activation region is set on a row-by-row and column-by-column basis in the array.

13. The optical radar apparatus according to claim 10, wherein
the activation region is set on a light detection element by light detection element basis.

14. The optical radar apparatus according to claim 10, wherein
light detection elements are SPADs.

15. The optical radar apparatus according to claim 14, wherein
the distance sensor includes a binary counter that is configured to sum pulse outputs from the SPADs.

16. The optical radar apparatus according to claim 1, wherein
the dimension of the light receiver in a direction perpendicular to the direction along which the light emitting section and the light receiving system are aligned with each other is greater than the size of the target field of view projected on the light receiver by at least the size of the projection region corresponding to the irradiated region on the object at the minimum measurable distance of the optical radar apparatus.

17. The optical radar apparatus according to claim 1, wherein
the activation region is contained in a projection region of the target field of view on the light receiver corresponding to the reflected light.

* * * * *